United States Patent
Ogura et al.

(10) Patent No.: US 7,248,633 B2
(45) Date of Patent: Jul. 24, 2007

(54) IMAGE DECODING DEVICE AND IMAGE DECODING METHOD

(75) Inventors: Takayuki Ogura, Chiba (JP); Masatoshi Takashima, Tokyo (JP)

(73) Assignee: Sony Corporation, Tokyo (JP)

( * ) Notice: Subject to any disclaimer, the term of this patent is extended or adjusted under 35 U.S.C. 154(b) by 544 days.

(21) Appl. No.: 10/484,789

(22) PCT Filed: May 27, 2003

(86) PCT No.: PCT/JP03/06619

§ 371 (c)(1),
(2), (4) Date: Jan. 23, 2004

(87) PCT Pub. No.: WO03/101118

PCT Pub. Date: Dec. 4, 2003

(65) Prior Publication Data

US 2004/0240547 A1    Dec. 2, 2004

(30) Foreign Application Priority Data

May 27, 2002   (JP) .............................. 2002-152717

(51) Int. Cl.
*H04N 7/18* (2006.01)

(52) U.S. Cl. .............................. 375/240.27; 375/240.25

(58) Field of Classification Search ..............................
375/240.01–240.29
See application file for complete search history.

(56) References Cited

U.S. PATENT DOCUMENTS 5,247,363 A * 9/1993 Sun et al. ................... 348/616
6,876,705 B2 * 4/2005 Katsavounidis et al. ..................... 375/240.28

FOREIGN PATENT DOCUMENTS

| JP | 2000-102018 | 4/2000 |
| JP | 3297293 | 4/2002 |

* cited by examiner

*Primary Examiner*—Anand S. Rao
(74) *Attorney, Agent, or Firm*—Frommer Lawrence & Haug LLP; William S. Frommer

(57) ABSTRACT

This invention is an MPEG decoding apparatus (10) for decoding a compression-coded image data stream, the apparatus including a motion compensation circuit (15) and error map table holding means (19) for holding an error map table with respect to a decoded frame to be referred to in performing motion compensation. When the error map table is referred to and an error block is found to be included in a reference area, or when dynamic image data of a decoding target block is broken, the motion compensation circuit (15) performs error conceal processing to interpolate a pixel in the decoding target block with a pixel in the decoded frame and output the resulting data. The motion compensation circuit (15) generates an error map table showing the error-concealed block as an error block and stores this error map table. This MPEG decoding apparatus (10) restrains propagation of an error due to the error conceal processing and reduces deterioration in image quality.

16 Claims, 18 Drawing Sheets

IMAGE DECODING DEVICE AND IMAGE DECODING METHOD

This application claims priority of Japanese Patent Application No. 2002-152717, filed on May 27, 2002, the entirety of which is incorporated by reference herein.

TECHNICAL FIELD

This invention relates to an image decoding apparatus and an image decoding method for decoding a dynamic image signal coded by using motion prediction performed by block, with each block including a predetermined number of pixels.

BACKGROUND ART

As compression coding systems for dynamic image signals, MPEG-2 (ISO/IEC 13818-2), MPEG-4 (ISO/IEC 14496-2) and the like are known. In MPEG-2 and MPEG-4, a dynamic image signal is compressed by a coding system utilizing motion prediction. In MPEG-2 and MPEG-4, motion prediction between frames is performed by block, with each block including, for example, 16×16 or 16×8 pixels. In MPEG-2 and MPEG-4, the predicted quantity of motion is expressed by a vector (called motion vector) and it is included in coded data. In MPEG-2 and MPEG-4, at the time of coding, a prediction frame is generated from a previously coded frame by utilizing a motion vector. Then, a difference between a coding target frame and the prediction frame is calculated and only that difference is coded, for example, by DCT (discrete cosine transform). In MPEG-2 and MPEG-4, at the time of decoding, a prediction frame is generated by using a motion vector with respect to a previously decoded reference frame, and the prediction frame and the decoded frame are added to restore an original image.

In the coding system utilizing motion prediction such as MPEG-2 and MPEG-4, since it suffices to code only a motion vector and a differential image, dynamic image data can be compressed efficiently.

Next, a conventional MPEG decoding apparatus for decoding a dynamic image data stream (elementary stream) compression-coded by the MPEG-2 system or the MPEG-4 system will be described.

FIG. 1 shows a block structural diagram of a conventional MPEG decoding apparatus.

A conventional MPEG decoding apparatus 100 has a syntax analyzer circuit 111, a variable-length code (VLC) table 112, an inverse quantizer (IQ) circuit 113, an inverse discrete cosine transform (IDCT) circuit 114, a motion compensation circuit 115, a frame memory 116, and a color format converter circuit 117, as shown in FIG. 1. Inside the motion compensation circuit 115, a selector 121, an MC controller 122 and an adder 123 are provided.

An elementary stream is inputted to the syntax analyzer circuit 111. The syntax analyzer circuit 111 detects a fixed-length code, analyzes a code length of a variable-length code and calculates an address of a variable-length code table, from the inputted elementary stream. The syntax analyzer circuit 111 detects a code that is before variable-length coding, from the calculated address with reference to the VLC table 112. The syntax analyzer circuit 111 detects these fixed-length code and variable-length code, thereby decoding DCT coefficient data, motion vector, and various control data for inverse quantization and motion compensation. The DCT coefficient data is rearranged in a predetermined scanning order and then supplied to the inverse quantizer circuit 113. The motion vector and the control data for motion compensation are supplied to the MC controller 122 of the motion compensation circuit 115.

The syntax analyzer circuit 111 outputs an error flag when a code that does not exist in the VLC table 112 is inputted to the inputted elementary stream, or when an error occurs in DCT coefficients to be outputted, for example, when the number of DCT coefficients in one DCT block exceeds 64. The error flag is generated by macroblock. The error flag is supplied to the MC controller 122 in the motion compensation circuit 115.

The inverse quantizer circuit 113 performs inverse quantization of the DCT coefficient data, using a quantization parameter used in coding. The inversely quantized DCT coefficient data is supplied to the inverse discrete cosine transform circuit 114.

The inverse discrete cosine transform circuit 114 performs two-dimensional inverse discrete cosine transform operation of each DCT block including 8×8 DCT coefficients, of the DCT coefficient data, and decodes image data of the spatial domain. The image data transformed by inverse discrete cosine transform is supplied to the motion compensation circuit 115.

The motion compensation circuit 115 performs motion compensation processing of the image data of the spatial domain that has been transformed by inverse discrete cosine transform.

The MC controller 122 in the motion compensation circuit 115 performs motion prediction by macroblock with respect to a reference frame stored in the frame memory 116 on the basis of the motion vector and the control data for motion compensation supplied from the syntax analyzer circuit 111, and thus generates a prediction frame. The adder 123 in the motion compensation circuit 115 adds, by macroblock, the prediction frame generated from the reference frame to the differential frame supplied from the inverse discrete cosine transform circuit 114, and thus generates an original frame. The frame outputted from the adder 123 is stored into the frame memory 116 as a decoded frame.

The selector 121 in the motion compensation circuit 115 performs processing to stop, by macroblock, the output of the differential frame from the inverse discrete cosine transform circuit 114 at the time of error conceal processing.

The error conceal processing is the processing to reduce visual imperfection in an error part, for example, if an error occurs in coded data at the time of transmission and there is a macroblock that is extremely different from the peripheral normal image.

The MC controller 122 performs the error conceal processing of a macroblock at which an error flag is raised by the syntax analyzer circuit 111. When the macroblock at which an error flag is raised by the syntax analyzer circuit 111, that is, a macroblock in which an error has occurred and its image has been broken, is a target macroblock of motion compensation, the MC controller 122 does not perform ordinary motion compensation but performs processing to interpolate the pixel having the error in the macroblock with a pixel of the reference frame that is at the same position as that macroblock, thus performing the error conceal processing. Specifically, the MC controller 122 uses a mode for referring to I-picture or P-picture, as an MB mode, which is a mode for designating a reference frame of that macroblock, and sets the motion vector value at 0, which indicates no motion from the reference frame. Then, the MC controller 122 sets the value of the macroblock as a decoding target at 0. That is, the MC controller 122 performs the error conceal processing by switching the selector 121 to set 0 as the input data from the inverse discrete cosine transform circuit 114 to the motion compensation circuit 115.

The color format converter circuit 117 performs video format conversion processing of the decoded image data stored in the frame memory 116. For example, the color format converter circuit 117 performs format conversion to the 4:2:2 format or 4:2:0 format prescribed by ITU-R601.

As described above, in the conventional MPEG decoding apparatus 100, coded data utilizing motion prediction can be decoded. In the conventional MPEG decoding apparatus 100, even if an image block broken at the time of transmission exists in a frame, the error conceal processing can be performed to interpolate the image block with an image block of another frame that is not broken. Therefore, it is possible to reduce visual imperfection due to the presence of a block that is extremely different from the peripheral normal image because of an error.

Meanwhile, in the case of performing motion compensation, if an error-concealed frame becomes a reference frame and a pixel within an error-concealed macroblock is referred to for motion compensation, motion compensation is performed on the basis of an erroneous reference value. If motion compensation is performed on the basis of such an erroneous reference value, the image within that macroblock is broken as a picture. In the case of performing motion compensation of the next frame, a pixel within the macroblock that is broken as a picture might be further referred to. That is, if the error conceal processing is performed, the error might be propagated temporally and spatially.

The temporal and spatial propagation of the influence of an error-concealed macroblock will now be described with reference to FIGS. 2, 3 and 4.

First, as shown in FIG. 2, it is assumed that a transmission error occurs in two macroblocks ($MB_3$, $MB_4$) in a certain I-picture ($I_1$). In this case, as the error conceal processing is performed, these macroblocks ($MB_3$, $MB_4$) are interpolated, for example, with macroblocks ($MB_3$, $MB_4$) at the same positions in a P-picture ($P_0$) that is immediately before $I_1$. Therefore, the image of the macroblocks ($MB_3$, $MB_4$) of decoded $I_1$ is different from the original picture but is not broken as a picture.

The next P-picture ($P_2$) uses $I_1$ as a reference frame for motion compensation. Since no transmission errors occur in this $P_2$, the error conceal processing is performed. However, for example, as shown in FIG. 3, three macroblocks ($MB_1$, $MB_3$, $MB_4$) in $P_2$ contain the pixels of the error-concealed macroblocks in the reference frame, in a reference area for motion compensation. Therefore, the image of the decoded macroblocks ($MB_1$, $MB_3$, $MB_4$) is different from the original picture and its picture is broken.

Subsequently, the next P-picture ($P_3$) uses $P_2$ as a reference frame for motion compensation, as shown in FIG. 4. A transmission error occurs in a certain macroblock ($MB_4$) of this $P_3$. In this case, as the error conceal processing is performed, the macroblock ($MB_4$) is interpolated, for example, with the macroblock ($MB_4$) at the same position in the P-picture ($P_2$) that is immediately before $P_3$. However, since the previous macroblock ($MB_4$) as the interpolation source has its picture already broken, the image of the macroblock ($MB_4$) to be interpolated differs from the original picture and its picture is broken.

Moreover, P-picture ($P_3$) contains the pixels of the error-concealed macroblock in the reference frame, for example, in a reference area for motion compensation of certain macroblocks ($MB_1$, $MB_2$, MB3). Therefore, the image of the decoded macroblocks ($MB_1$, $MB_2$, $MB_3$) differs from the original picture and its picture is broken.

As described above, in the case the error conceal processing is performed, the error is propagated until the next I-picture (I4) is decoded, and the error is spread in a planar direction by motion compensation. Such expansion of error seriously deteriorates the image.

DISCLOSURE OF THE INVENTION

It is an object of the present invention to provide a new image decoding apparatus and image decoding method that can solve the problem of the conventional image decoding apparatus and image decoding method.

It is another object of the present invention to provide a dynamic image decoding apparatus and method that restrains propagation of an error and reduces deterioration in image quality even in the case a block of an image that is being decoded has referred to a frame containing an error in motion compensation.

An image decoding apparatus according to the present invention is an image decoding apparatus for decoding dynamic image coded data coded by a coding system for dividing a frame into plural blocks and performing motion prediction coding of each block, the apparatus including: motion compensation means for, when the motion prediction-coded block is a decoding target block, specifying a reference area in a decoded frame using motion prediction information included the image coded data and performing motion compensation of the decoding target block using information of the specified reference area; and error map table holding means for holding an error map table with respect to the decoded frame to be referred to when performing motion compensation; wherein an error block existing in the decoded frame is shown in the error map table, and when the error map table is referred to and an error block is found to be included in the block included in the reference area, or when the dynamic image coded data of the decoding target block is broken, the motion compensation means performs error conceal processing to interpolate a pixel in the decoding target block with a pixel of the decoded frame and output the resulting data, then generates an error map table showing the error-concealed block as an error block, and stores the error map table into the error map table holding means.

An image decoding method according to the present invention is an image decoding method for decoding dynamic image coded data coded by a coding system for dividing a frame into plural blocks and performing motion prediction coding of each block, the method including: specifying a reference area in a decoded frame using motion prediction information included the image coded data, then performing motion compensation of the decoding target block using information of the specified reference area, and thus decoding the dynamic image coded data; wherein in performing motion compensation, when an error map table showing an error block existing in the decoded block is referred to and an error block is found to be included in the block included in the reference area, or when the dynamic image coded data of the decoding target block is broken, error conceal processing to interpolate a pixel in the decoding target block with a pixel of the decoded frame and output the resulting data is performed, and an error map table showing the error-concealed block as an error block is generated.

The other objects of the present invention and specific advantages provided by the present invention will be further clarified by the following description of an embodiment described with reference to the drawings.

BEST MODE FOR CARRYING OUT THE INVENTION

Hereinafter, an example of applying the present invention to an MPEG decoding apparatus will be described.

An MPEG decoding apparatus to which the present invention is applied is an apparatus for decoding an image data stream (elementary stream) that is compression-coded by the MEPG-2 system (ISO/IEC 13818-2) or MPEG-4 system (ISO/IEC 14496-2). In MPEG-2 and MPEG-4, motion prediction between frames is performed by predetermined pixel block and compression coding is thus performed. A minimum pixel block for performing motion compensation is hereinafter called macroblock.

Figure 1:
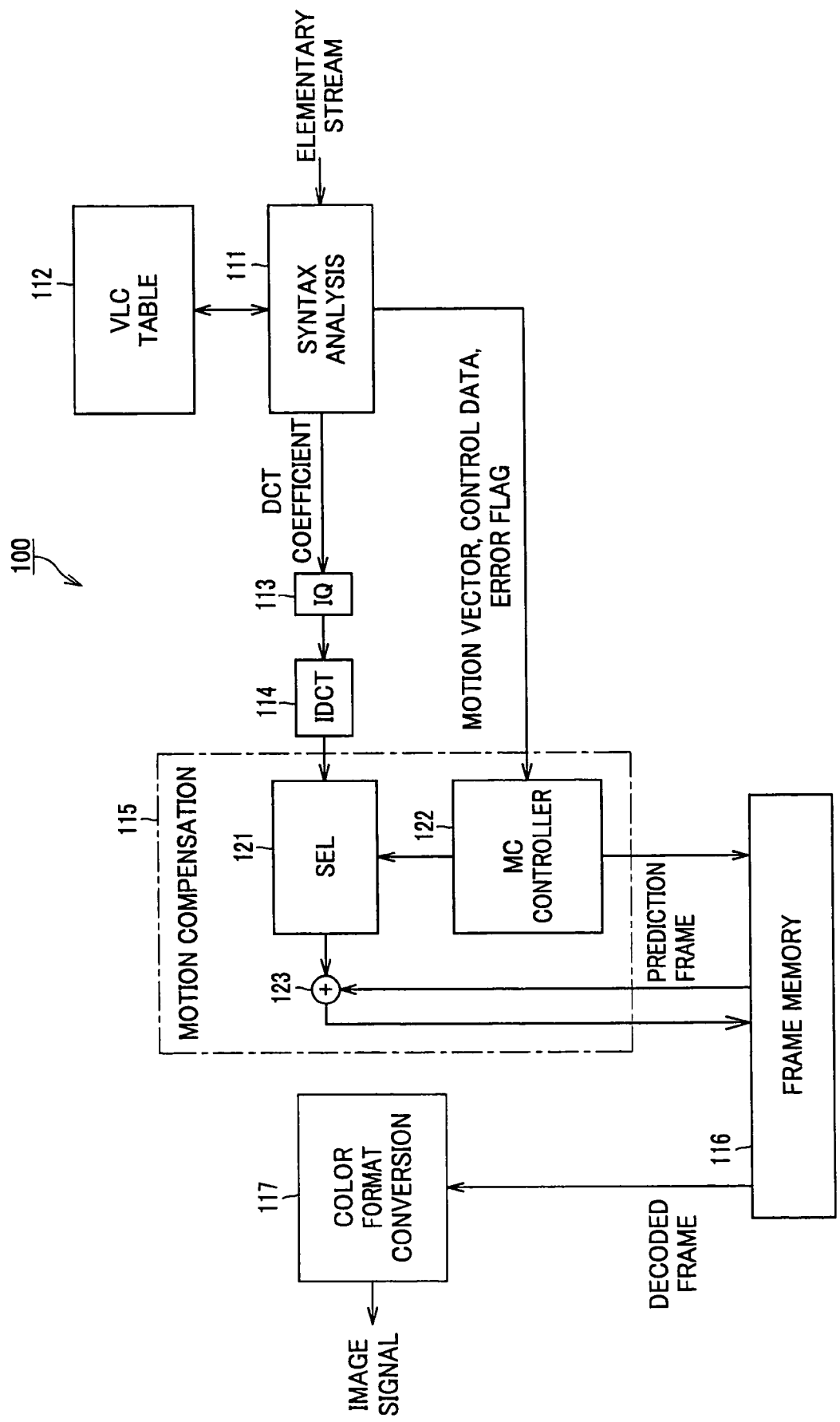
FIG. 1 is a block diagram showing a conventional MPEG decoding apparatus.
Figure 2:
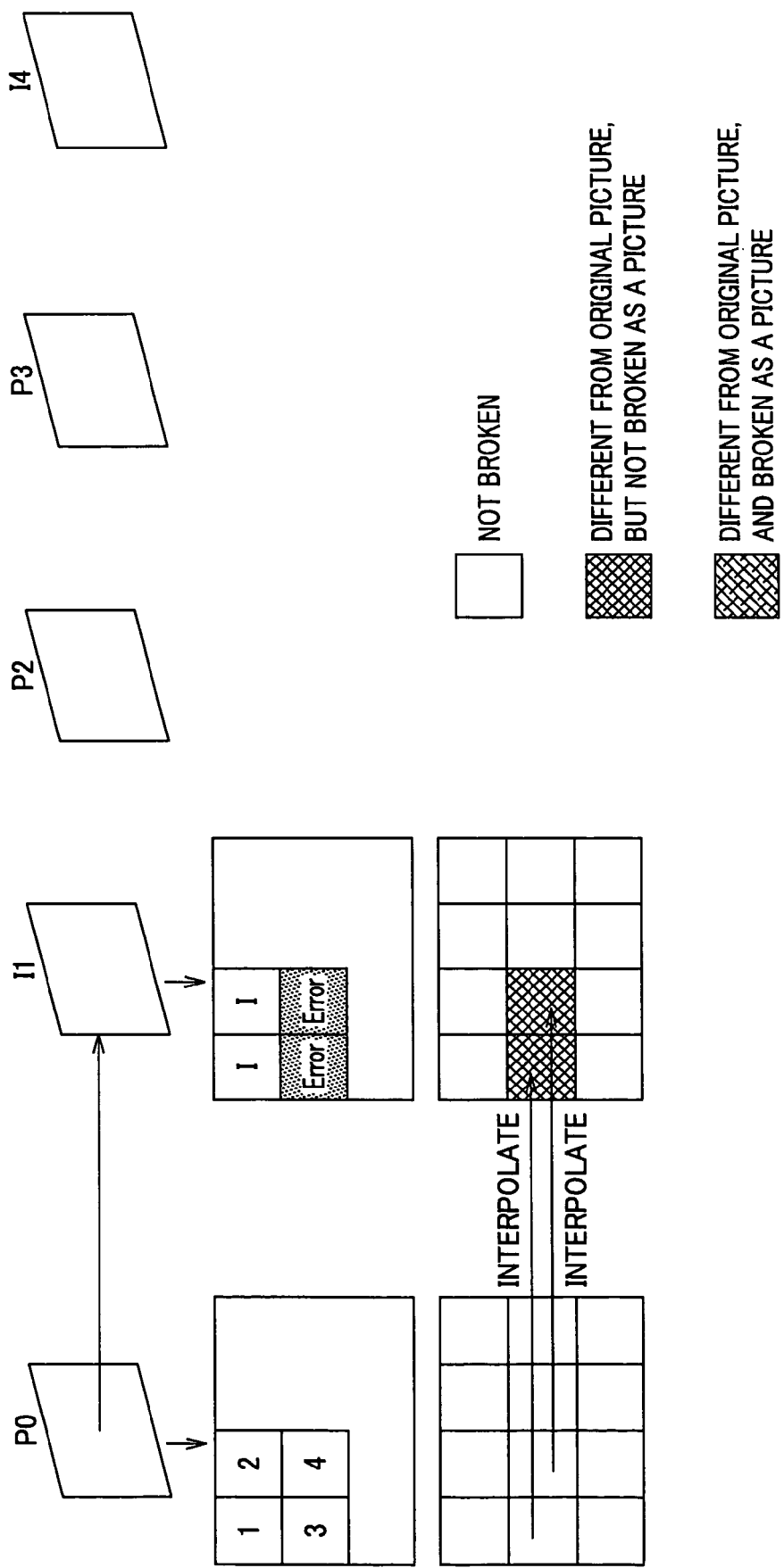
FIG. 2 is a view for explaining temporal and spatial propagation of the influence of an error-concealed macroblock.
Figure 3:
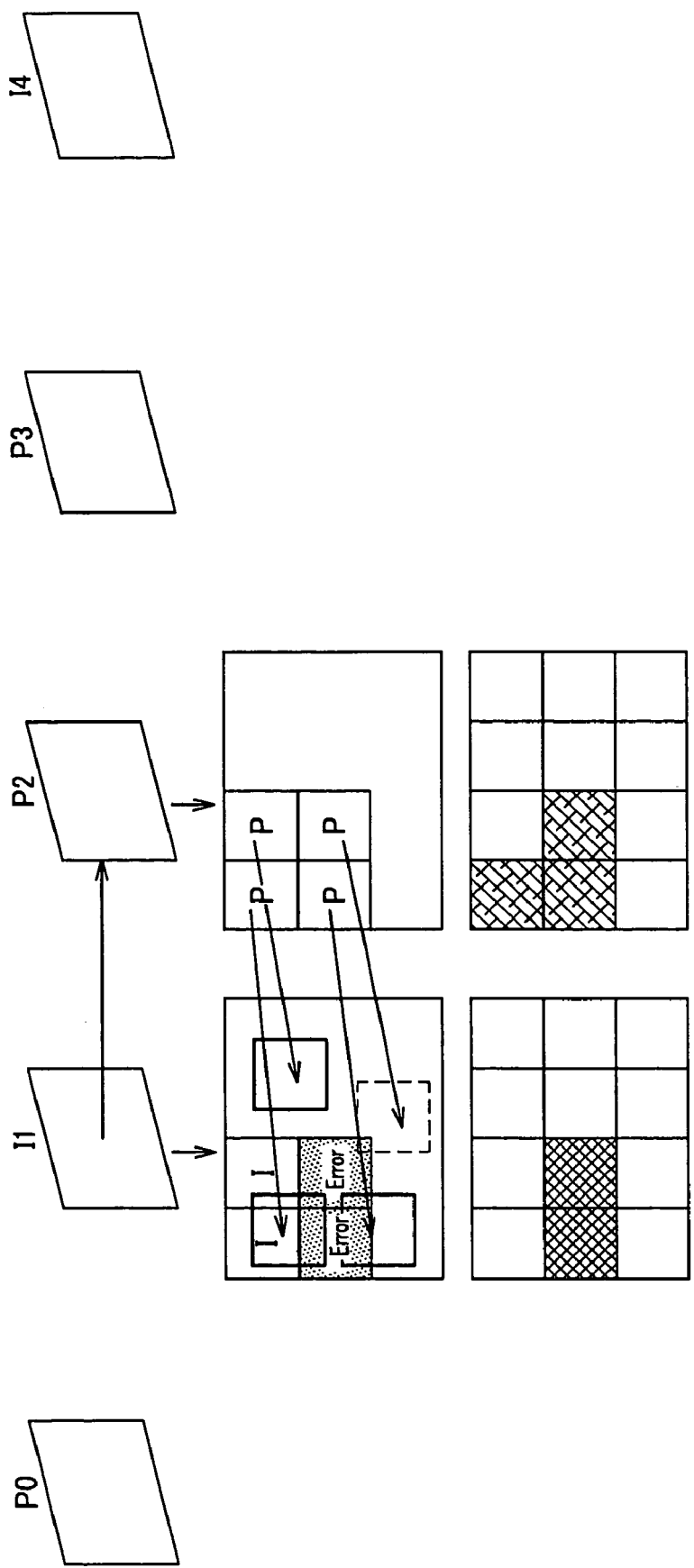
FIG. 3 is a view showing a state continuing from FIG. 2.
Figure 4:
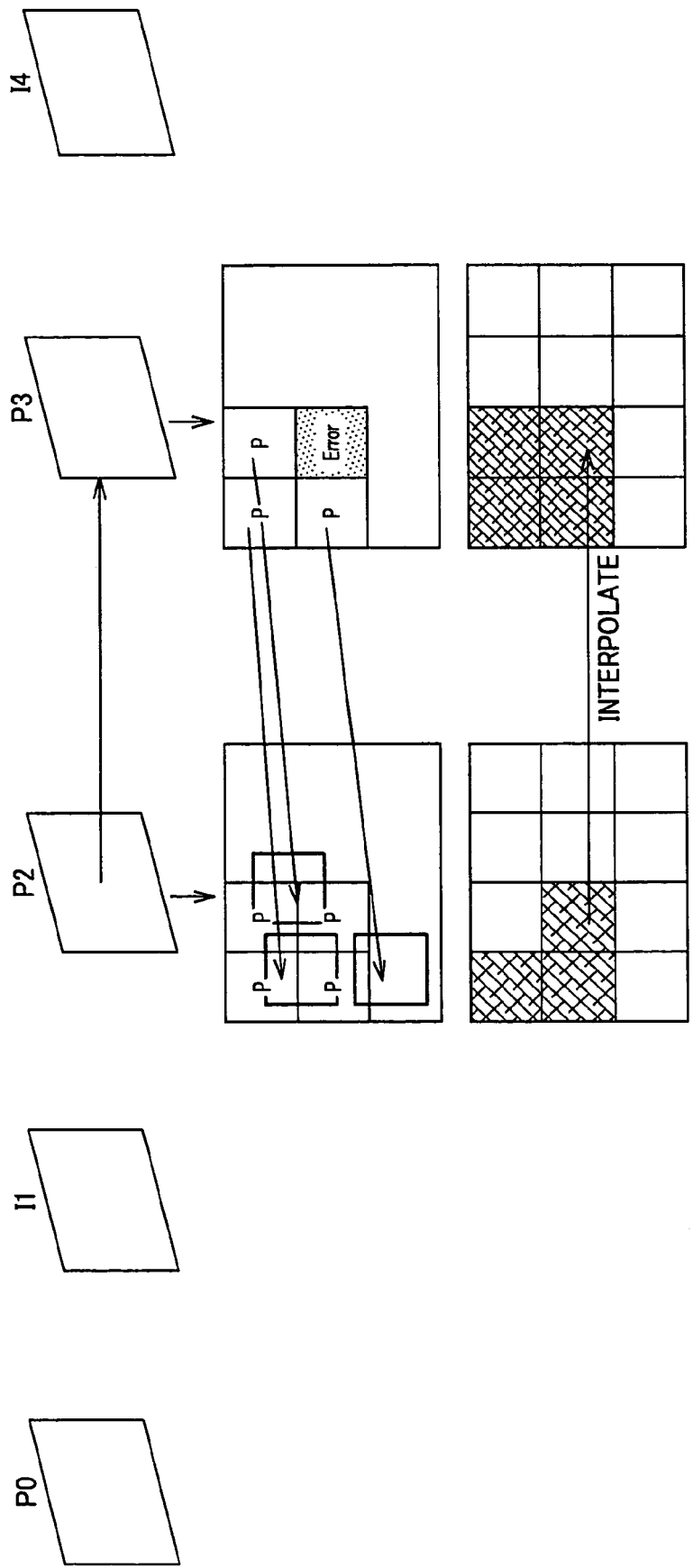
FIG. 4 is a view showing a state continuing from FIG. 3.
Figure 5:
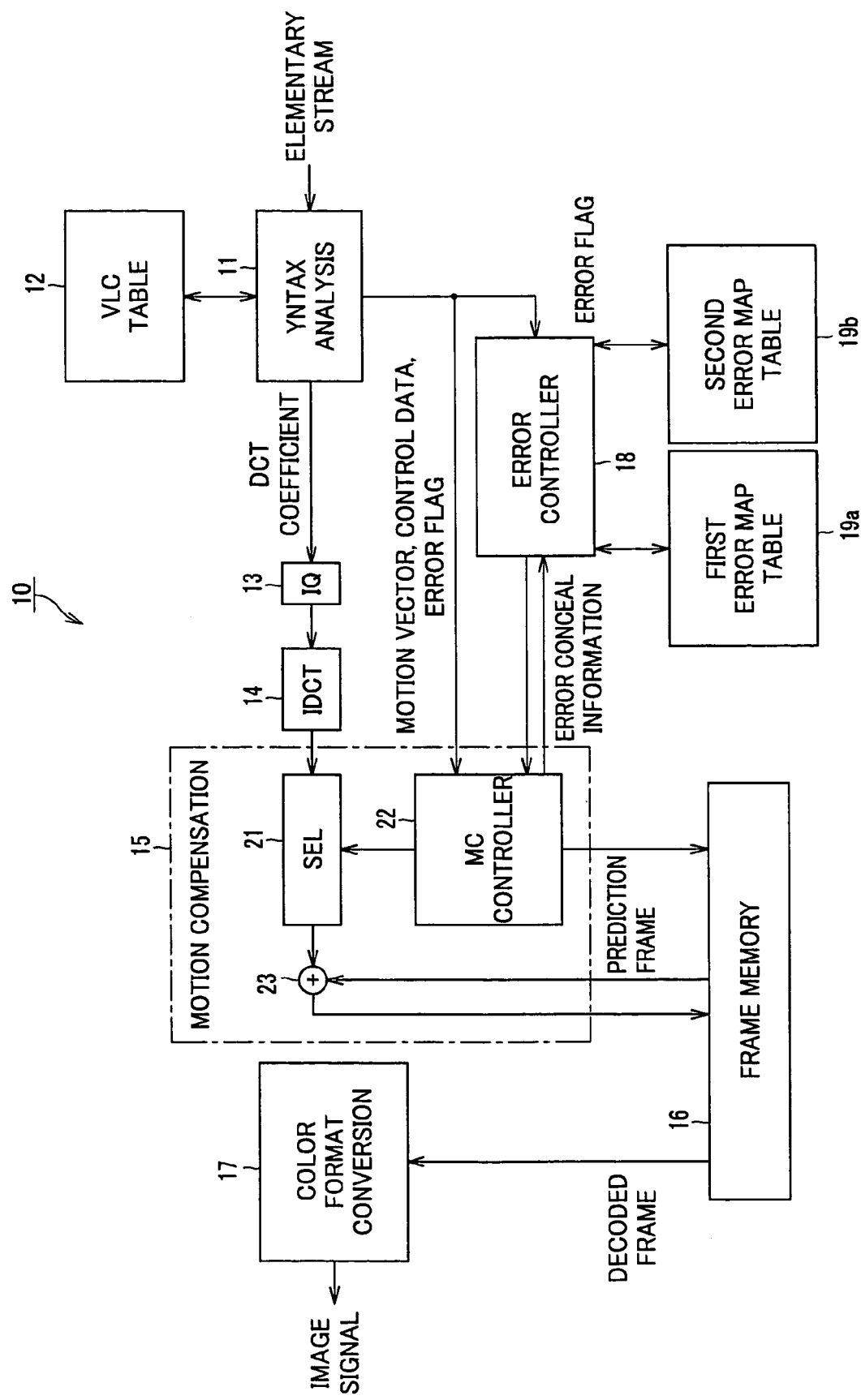
FIG. 5 is a block diagram showing an MPEG decoding apparatus to which the present invention is applied.

An MPEG decoding apparatus 10 to which the present invention is applied has a syntax analyzer circuit 11, a variable-length code (VLC) table 12, an inverse quantizer (IQ) circuit 13, an inverse discrete cosine transform (IDCT) circuit 14, a motion compensation circuit 15, a frame memory 16, a color format converter circuit 17, an error controller 18, and two error map table storage units 19a, 19b, as shown in FIG. 5. Inside the motion compensation circuit 15, a selector 21, an MC controller 22 and an adder 23 are provided.

An elementary stream is inputted to the syntax analyzer circuit 11. The syntax analyzer circuit 11 detects a fixed-length code, analyzes a code length of a variable-length code and calculates an address of a variable-length code table, from the inputted elementary stream. The syntax analyzer circuit 11 detects a code that is before variable-length coding, from the calculated address with reference to the VLC table 12. The syntax analyzer circuit 11 detects these fixed-length code and variable-length code, thereby decoding DCT coefficient data, motion vector, various control data for inverse quantization and motion compensation and the like. The DCT coefficient data is rearranged in a predetermined scanning order and then supplied to the inverse quantizer circuit 13. The motion vector and the control data for motion compensation are supplied to the MC controller 22 of the motion compensation circuit 15.

The syntax analyzer circuit 11 outputs an error flag when a code that does not exist in the VLC table 12 is inputted to the inputted elementary stream, or when an error occurs in DCT coefficients to be outputted, for example, when the number of DCT coefficients in one DCT block exceeds 64. The error flag is generated by macroblock. The error flag is supplied to the MC controller 22 in the motion compensation circuit 15.

The inverse quantizer circuit 13 performs inverse quantization of the DCT coefficient data, using a quantization parameter used in coding. The inversely quantized DCT coefficient data is supplied to the inverse discrete cosine transform circuit 14.

The inverse discrete cosine transform circuit 14 performs two-dimensional inverse discrete cosine transform operation of each DCT block including, for example, 8×8 DCT coefficients, of the DCT coefficient data, and decodes image data of the spatial domain. The image data transformed by inverse discrete cosine transform is supplied to the motion compensation circuit 15.

The motion compensation circuit 15 performs motion compensation processing of the image data of the spatial domain that has been transformed by inverse discrete cosine transform. Only an inter-macroblock between a P-picture and a B-picture is motion-compensated. When an intra-macroblock is inputted, the motion compensation processing is not performed. The motion compensation circuit 15 performs error conceal processing of a macroblock that meets a predetermined condition. The error conceal processing is performed irrespective of whether an intra-macroblock or an inter-macroblock is inputted. The motion compensation circuit 15 does not perform ordinary motion compensation processing with respect to a macroblock to be error-concealed. The error conceal processing used in this apparatus will be later described in detail.

When the inputted macroblock is an inter-macroblock, the MC controller 22 in the motion compensation circuit 15 performs motion prediction by macroblock with respect to a reference frame stored in the frame memory 16 on the basis of the motion vector and the control data for motion compensation supplied from the syntax analyzer circuit 11, and thus generates a prediction frame. The adder 23 in the motion compensation circuit 15 adds, by macroblock, the prediction frame generated from the reference frame to the differential frame supplied from the inverse discrete cosine transform circuit 14, and thus generates an original frame. When the inputted macroblock is an intra-macroblock, the MC controller 22 does not generate a prediction frame. In this case, the adder 23 in the motion compensation circuit 15 adds no data to the intra-macroblock outputted from the inverse discrete cosine transform circuit 14 and outputs the macroblock as it is. The restored frame outputted from the adder 23 is stored into the frame memory 16.

In the case of performing ordinary motion compensation, the selector (SEL) 21 in the motion compensation circuit 15 supplies the output of the differential frame from the inverse discrete cosine transform circuit 14 to the adder 23 as it is. On the other hand, in the error conceal processing, the selector 21 performs processing to stop, by macroblock, the output of the differential frame from the inverse discrete cosine transform circuit 14. The selector 21 is controlled by the MC controller 22.

The color format converter circuit 17 performs video format conversion processing of the decoded image data stored in the frame memory 16. For example, the color format converter circuit 17 performs format conversion to the 4:2:2 format or 4:2:0 format prescribed by ITU-R601.

The error controller 18 performs update control of writing and reading of error map tables stored in the first error map table storage unit 19a and the second error map table storage unit 19b. The error controller 18 performs update control of the error map tables on the basis of error conceal information outputted from the MC controller 22.

An error map table will now be described.

Figure 6:
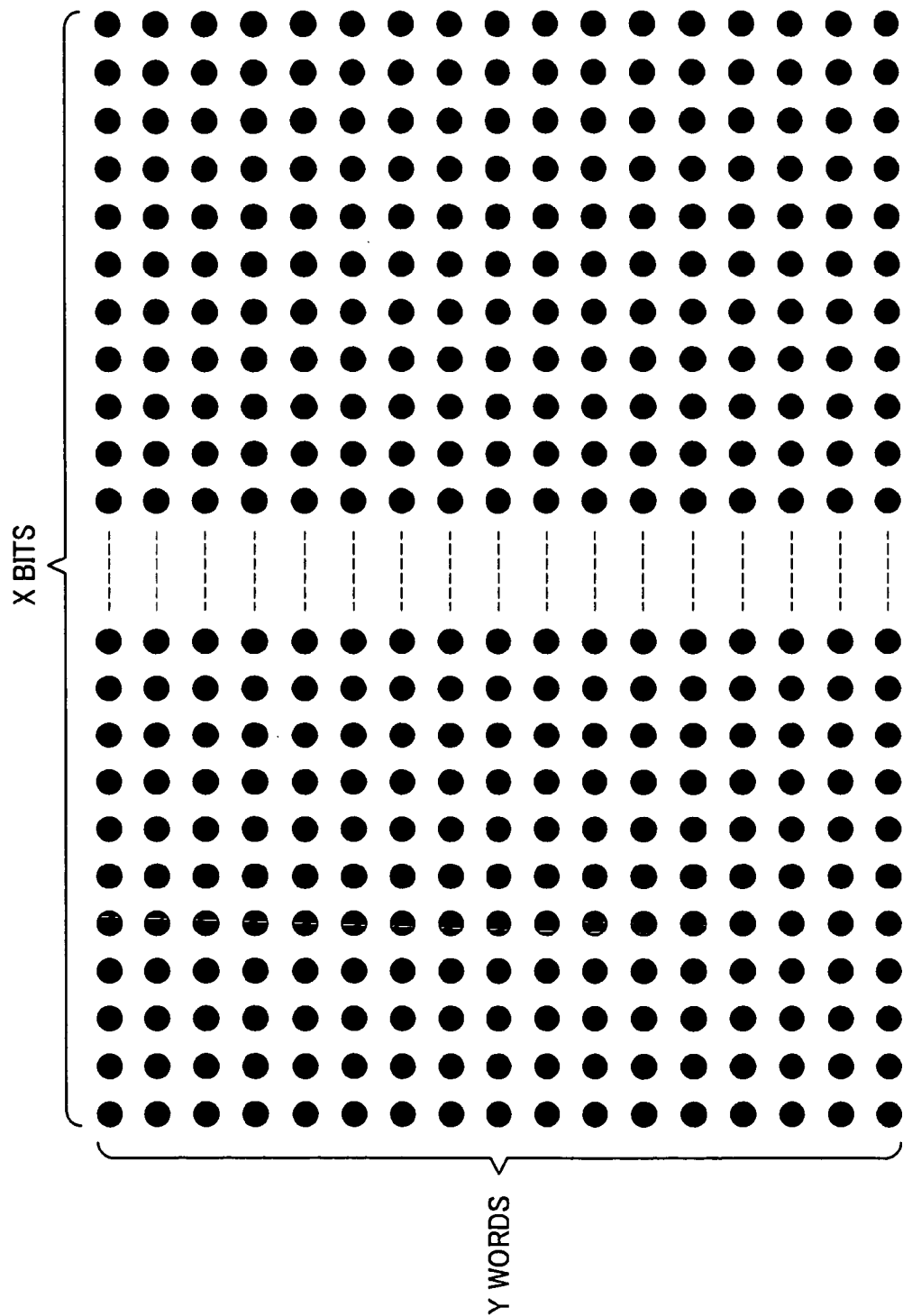
FIG. 6 is a view showing an error map table.
Figure 7:
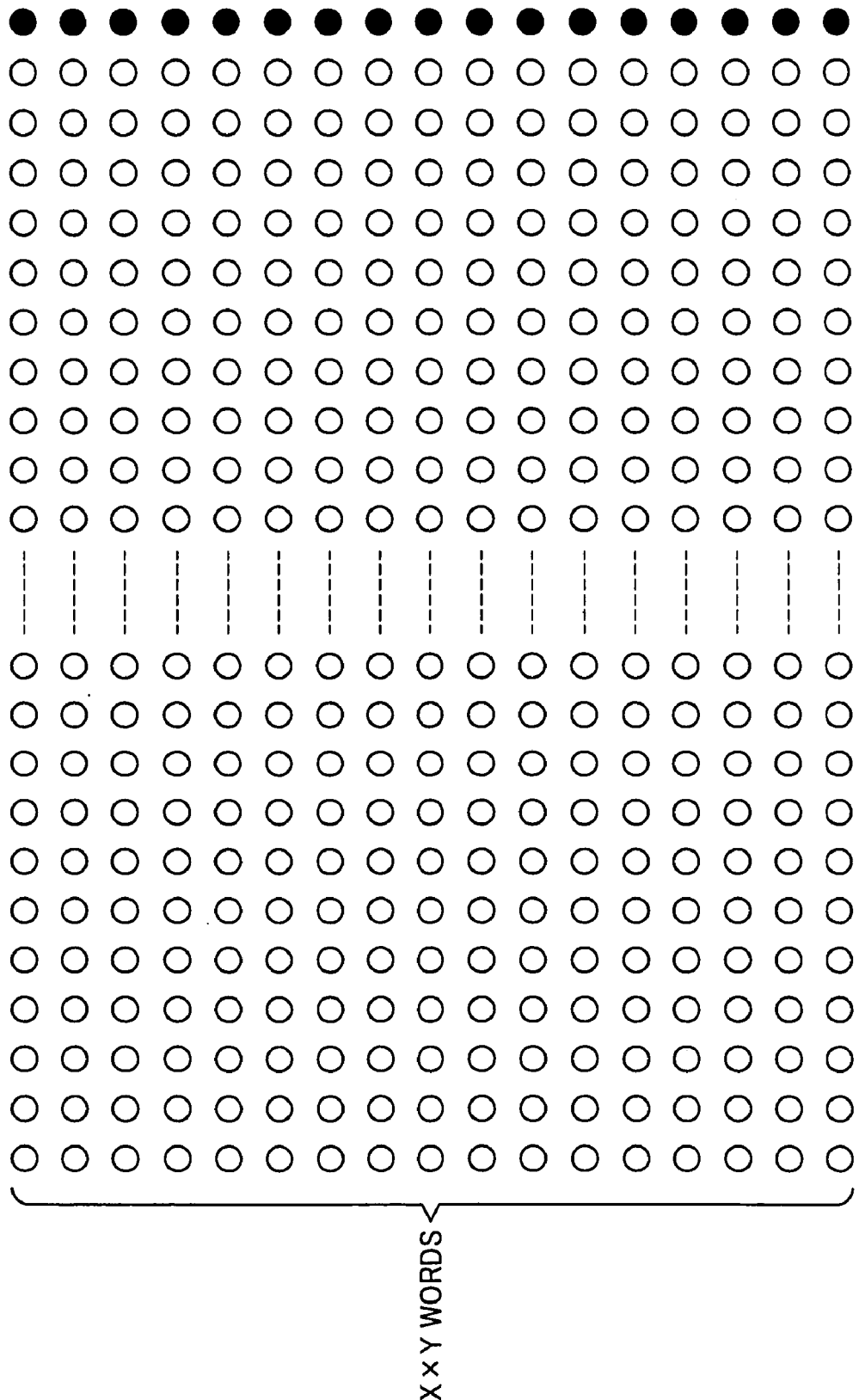
FIG. 7 is a view showing another form of error map table.

An error map table is information specifying the position of an error-concealed macroblock. The error map table is generated by frame. If one frame is formed by X horizontal macroblocks by Y vertical macroblocks, the error map table is information of Y words, with each word constituted by X bits, for example, as shown in FIG. 6. That is, the error map table is information indicating whether the content of each bit is error-concealed or not, with the address position of each bit corresponding to the position of the macroblock in frame. The structure of the error map table is not limited to the structure of FIG. 6 and information of X×Y words with each word constituted by one bit can be also be used, for example, as shown in. FIG. 7.

In the case the error conceal processing is performed with respect to an arbitrary macroblock, the error controller 18 accesses an error map table corresponding to a frame that is being decoded, and validates (1) the bit value of the address corresponding to that macroblock. In the case the error conceal processing is not performed with respect to an arbitrary macroblock, the error controller 18 accesses an error map table corresponding to a frame that is being decoded, and invalidates (0) the bit value of the address corresponding to that macroblock.

In the error map table storage units 19a, 19b, an error map table corresponding to a frame that is displayed immediately before or after the currently decoded frame and that can be a reference frame is stored. Specifically, if the currently decoded frame is a P-picture, an error map table corresponding to an I-picture or P-picture that is immediately before the P-picture (the past picture that is temporally closest to the P-picture) is stored in the error map table storage units 19a, 19b. If the currently decoded frame is a B-picture, error map tables corresponding to an I-picture or P-picture that is immediately before the B-picture (the past picture that is temporally closest to the B-picture) and an I-picture or P-picture that is immediately after the B-picture (the future picture that is temporally closest to the B-picture) are stored in the error map table storage units 19a, 19b. If the currently decoded frame is an I-picture, an error map table corresponding to an I-picture or P-picture that is immediately before that I-picture (the past picture that is temporally closest to that I-picture) is stored in the error map table storage units 19a, 19b. That is, if an I-picture or P-picture is being decoded, one error map table corresponding to an I-picture or P-picture that is immediately before the currently decoded I-picture or P-picture is stored in one of the error map table storage units 19a, 19b. If a B-picture is being decoded, error map tables corresponding to two frames, that is, an I-picture or P-picture that is immediately before the currently decoded B-picture and an I-picture or P-picture that is immediately after the currently decoded B-picture, are stored in the error map table storage units 19a, 19b.

A new error map table is generated if the currently decoded frame can be a reference frame. That is, a new error map table is generated if the currently decoded frame is an I-picture or P-picture. If the currently decoded frame is an I-picture or P-picture, the MC controller 22 sends information indicating whether or not the error conceal processing is performed with respect to a macroblock in that frame (error conceal information) to the error controller 18 every time one macroblock is processed. On the basis of the error conceal information, the error controller 18 updates the contents of the error map tables in the error map table storage units 19a, 19b.

When an I-picture or P-picture is being decoded, an error map table corresponding to a reference frame is stored in one of the error map table storage units 19a, 19b. That is, since only one reference frame exists for an I-picture or P-picture, only one error map table is stored. Therefore, the error controller 18 updates the error map table in the other storage unit where the error map table corresponding to the reference frame is not stored. As a result, as decoding proceeds, the two error map table storage units 19a, 19b are alternately selected and the contents of the error map tables are updated.

A B-picture cannot be a reference frame. Therefore, when a B-picture is being decoded, the error map table corresponding to the currently decoded frame is not updated. However, in the case of performing motion compensation of a B-picture, as two reference frames exist in the past and future, valid error map tables are stored in both of the two error map table storage units 19a, 19b.

The error conceal processing will now be described.

The error conceal processing is the processing to interpolate all the pixels in a macroblock that is a processing target of motion compensation, with the pixels of a macroblock in a reference frame situated at the same position as that macroblock. In the pixel interpolation processing, the pixel values of the reference frame may be substituted for the pixels in the macroblock as a processing target of motion compensation, or the pixel values of the reference frame may be processed in a certain way and then used as the pixels of the macroblock as a processing target of motion compensation.

The error conceal processing is performed by the MC controller 22. The error conceal processing is performed with a macroblock as a unit. The error conceal processing can be performed by setting a mode of referring to an I-picture or P-picture is used as an MB mode of that macroblock, that is, as a mode of designating a reference frame, then setting the value of a motion vector at 0, that is, assuming no motion from the reference frame, and setting the value of the macroblock as a decoding target at 0, that is, switching off the selector 21 to set 0 as input data from the inverse discrete cosine transform circuit 14 to the motion compensation circuit 15.

Next, conditions of performing the error conceal processing in the present MPEG decoding apparatus 10 will be described.

The MC controller 22 refers to the picture type of the currently decoded frame, the contents of an error map table of a reference frame, an error flag with respect to the currently decoded macroblock from the syntax analyzer circuit 11 and the MB mode of the currently decoded macroblock, and performs the error conceal processing of the currently decoded macroblock when one of the following conditions 1 to 3 is met.

Condition 1

If the MC controller 22 receives an error flag from the syntax analyzer circuit 11, the MC controller 22 performs the error conceal processing of a macroblock for which that error flag is generated. That is, if a code that does not exist in the VLC table 12 is inputted, or if an error occurs in DCT coefficients, for example, if the number of DCT coefficients in one DCT block exceeds 64, the MC controller 22 performs the error conceal processing. This processing condition is similar to that of the conventional error conceal processing.

Condition 2

If the currently decoded macroblock is a macroblock belonging to a P-picture or B-picture and a reference area within a reference frame to be referred to in motion compensation has already been error-concealed, the MC controller 22 performs the error conceal processing of the currently decoded macroblock. The reference area is an arbitrary area within the reference frame to be referred to when performing motion compensation. This reference area is of the same size as the macroblock and its position is specified by a motion vector with respect to the macroblock that is being decoded. The motion vector is expressed by half a pixel as a unit. Therefore, the reference area is set at a position over four macroblocks at the maximum. Under this condition 2, if at least one of the macroblocks included in the reference area has already been error-concealed, also the error conceal processing of the currently decoded macroblock is performed. Whether or not a macroblock included in the reference area has already been error-concealed can be judged by first calculating the macroblocks (four macroblocks at the maximum) included in the reference area from the motion vector and then reading out the bit values corresponding to the specified macroblocks from the error map table. The MC controller 22 reads out the error map table for the reference frame, and when it is judged that the bit values indicating the macroblocks included in the reference frame are valid, the MC controller 22 performs the error conceal processing of the currently decoded macroblock.

Condition 3

If the currently decoded macroblock is a macroblock belonging to a B-picture and a macroblock situated at the same position as the currently decoded macroblock in a future reference frame of that B-picture has been error-concealed, the MC controller 22 performs the error conceal processing of the currently decoded macroblock. For example, it is assumed that frames are arrayed in a display order of $I_1$, $B_2$ and $P_3$ and that the error conceal processing has been performed by interpolating an arbitrary macroblock of $P_3$ with the image of $I_1$. In this case, if the error conceal processing of $B_2$ is not performed, the display order after decoding will be $I_1$, $B_2$ and $I_1$, and temporal matching of display cannot be realized. Therefore, the error conceal processing of the B-picture is performed on the basis of this condition 3.

Hereinafter, an example of processing by the MC controller 22 with respect to a stream including I-pictures and P-pictures will be described.

Figure 8:
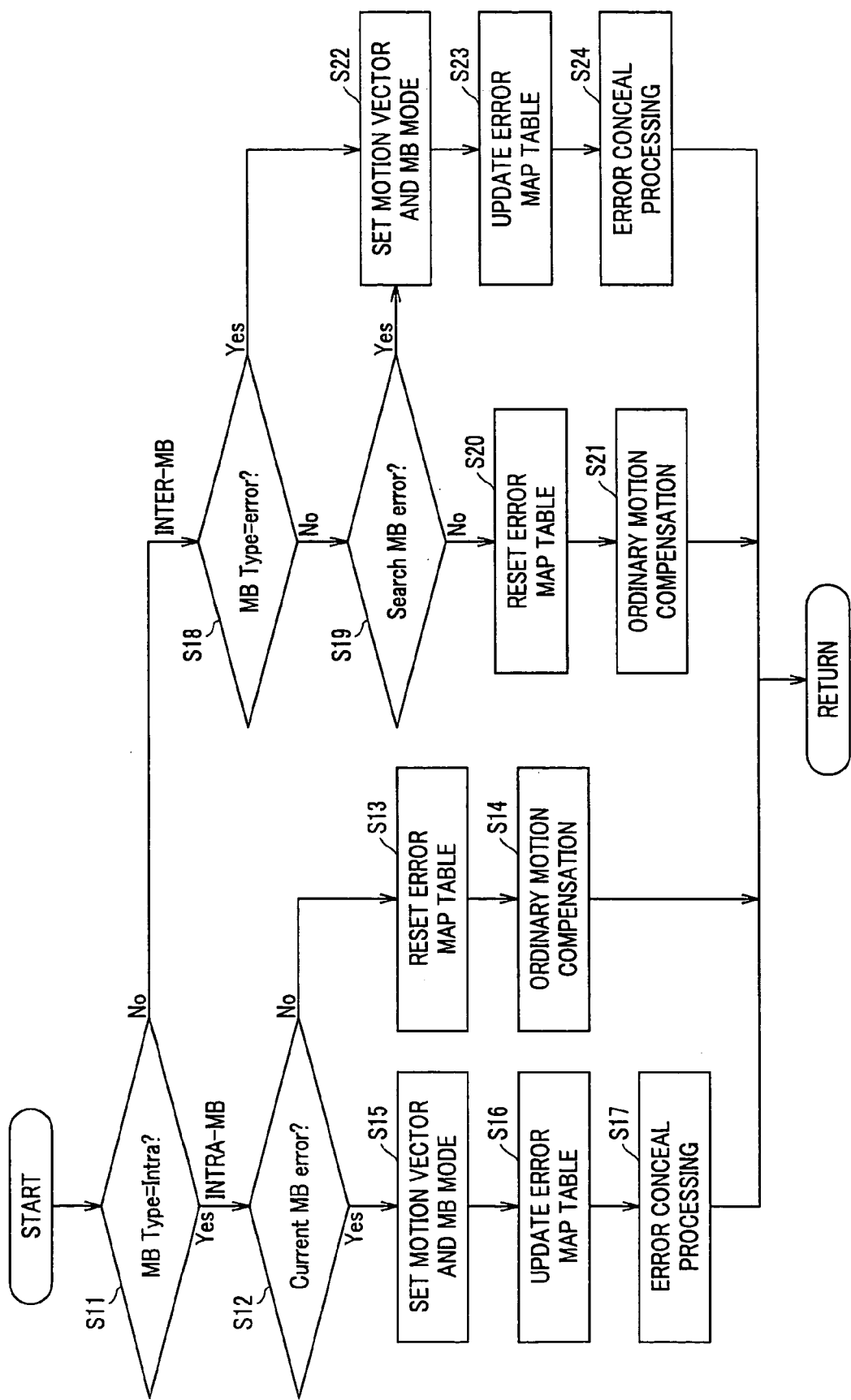
FIG. 8 is a flowchart showing the processing by an MC controller with respect to a stream including I-pictures and P-pictures.

FIG. 8 shows a processing flow in the MC controller 22 with respect to a stream including I-pictures and P-pictures.

The MC controller 22 repeats the processing of the following steps S11 to S24 for each macroblock inputted to the motion compensation circuit 15.

First, at step S11, the MC controller 22 judges the macroblock type of a macroblock that is a decoding target on the basis of information provided from the syntax analyzer circuit 11. If the macroblock type is intra-macroblock, the processing goes to step S12. If the macroblock type is inter-macroblock, the processing goes to step S18.

If the macroblock type is intra-macroblock, the MC controller 22 at step S12 judges whether or not an error flag is provided from the syntax analyzer circuit 11 with respect to the macroblock of the decoding target. That is, the MC controller 22 judges whether or not an error has occurred in the macroblock of the decoding target. If an error has not occurred, the processing goes to step S13. If an error has occurred, the processing goes to step S15.

At step S13, the MC controller 22 invalidates a bit value corresponding to the macroblock of the decoding target, in the error map table. Specifically, the MC controller 22 updates the error map table so as to indicate that the error conceal processing of that macroblock was not performed. Next, at step S14, the MC controller 22 performs ordinary motion compensation using a motion vector and a macroblock mode provided from the syntax analyzer circuit 11 and ends the processing of this flow.

At step S15, the MC controller 22 sets the values of a motion vector at x=0 and y=0, and also sets a forward prediction mode as the macroblock mode. That is, the motion vector and the macroblock mode are set so as to refer to a macroblock situated at the same position as the macroblock of the decoding target, in a past reference frame. Next, at step S16, the MC controller 22 validates the bit value corresponding to the macroblock of the decoding target in the error map table. That is, the MC controller 22 updates the error map table so as to indicate that the macroblock has been error-concealed. Next, at step S17, the MC controller 22 performs motion compensation processing using the motion vector and the macroblock mode set at step S15. In this processing, the selector 21 is switched to set 0 as the input of image data of that macroblock supplied from the discrete cosine transform circuit 14. The processing of this step S17 is the error conceal processing under the above-described condition 1. When the processing of step S17 is completed, the MC controller 22 ends the processing of this flow.

On the other hand, if the macroblock type is inter-macroblock, the MC controller 22 at step S18 judges whether or not an error flag is provided from the syntax analyzer circuit 11 with respect to the macroblock of the decoding target. That is, the MC controller 22 judges whether or not an error has occurred in the macroblock of the decoding target. If an error has not occurred, the processing goes to step S19. If an error has occurred, the processing goes to step S22.

At step S19, the MC controller 22 judges whether or not a macroblock included in the reference area has already been error-concealed.

This judgment at step S19 can be made, for example, by executing the following program.

```
10: Vector_xr = Vector_x >> 4
20: Vector_yr = Vector_y >> 4
30: If(Vector_x % 16! = 0)
    If(vector_x < 0) x_flag=-1 else x_flag = 1
    else x_flag = 0
40: If(Vector_y % 16! = 0)
    If(vector_y < 0) y_flag=-1 else y_flag = 1
    else y_flag = 0
50: MB_flag = {Error_Map[mb_adr_x + Vector_xr][mb_adr_y + Vector_yr]
or
Error_Map[mb_adr_x + Vector_xr + x_flag][mb_adr_y + Vector_yr] or
Error_Map[mb_adr_x + Vector_xr][mb_adr_y + Vector_yr + y_flag] or
Error_Map[mb_adr_x + Vector_xr + x_flag][mb_adr_y + Vector_yr + y_flag]}
60: if(MB_flag = 1) Search_MB_error = Yes
70: if(MB_flag = 0) Search_MB_error = No
```

The above-described program will be described in detail.

On line 10, four-bit right-shift operation of the value (Vector_x) in the X-direction of the original motion vector expressed by binary numbers is performed and the resulting value is substituted into the variable Vector_xr. Since one macroblock includes 16×16 pixels, as the value in the X-direction of the motion vector is divided by 16, the value of the motion vector expressed for each pixel can be converted to a motion vector expressed for each macroblock. That is, on this line 10, the motion vector (Vector_xr) in the X-direction converted by macroblock is calculated.

On line 20, four-bit right-shift operation of the value (Vector_y) in the Y-direction of the original motion vector expressed by binary numbers is performed and the resulting value is substituted into the variable Vector_xy. That is, on this line 20, the motion vector (Vector_xy) in the Y-direction converted by macroblock is calculated.

On line 30, if the value (Vector_x) in the X-direction of the original motion vector can be divided by 16 without a remainder, 0 is substituted into the variable x_flag. If Vector_x cannot be divided by 16 without a remainder and is negative, -1 is substituted into the variable x_flag. If Vector_x cannot be divided by 16 without a remainder and is not negative, 1 is substituted into the variable x_flag. That is, if the position in the X-direction of the reference area perfectly coincides with the boundary position of the macroblock, 0 is substituted into x_flag. If not, 1 or -1 is substituted into x_flag. If the position does not coincide, the reference area is situated over two macroblocks in the X-directions.

On line 40, if the value (Vector_y) in the Y-direction of the original motion vector can be divided by 16 without a remainder, 0 is substituted into the variable y_flag. If Vector_y cannot be divided by 16 without a remainder and is negative, -1 is substituted into the variable y_flag. If Vector_y cannot be divided by 16 without a remainder and is not negative, 1 is substituted into the variable y_flag. That is, if the position in the Y-direction of the reference area perfectly coincides with the boundary position of the macroblock, 0 is substituted into y_flag. If not, 1 or -1 is substituted into y_flag. If the position does not coincide, the reference area is situated over two macroblocks in the Y-directions.

On line 50, the error map table is referred to and bit values in the error map table corresponding to all the macroblocks (four macroblocks at the maximum) included in the reference area are found. The logical sum of these is calculated and substituted into the variable MB_flag. The operation expression Error_Map[X][Y] reads out a bit at the position of addresses X, Y in the error map table. mb_adr_x indicates the address in the X-direction of the currently decoded macroblock, and mb_adr_y indicates the address in the Y-direction of the currently decoded macroblock.

On lines 60 and 70, if the variable MB_flag is 1, that is, if MB_flag is valid, it is judged that Search_MB_error=Yes (the value of a bit corresponding to a reference macroblock in the error map table with respect to the reference frame is valid). If the variable MB_flag is 0, that is, if MB_flag is invalid, it is judged that Search_MB_error=No (the value of a bit corresponding to a reference macroblock in the error map table with respect to the reference frame is valid).

By executing the processing program of the above-described lines 10 to 70, the MC controller 22 can judge whether or not the reference area has already been error-concealed. If the MC controller 22 judges that the reference area had not been error-concealed, the processing goes to step S20. If the MC controller 22 judges that the reference area has already been error-concealed, the processing goes to step S22.

At step S20, the MC controller 22 invalidates the bit value corresponding to the macroblock of the decoding target in the error map table for that macroblock. That is, the MC controller 22 updates the error map table so as to indicate that the error conceal processing of that macroblock was not performed. Next, at step S21, the MC controller 22 performs ordinary motion compensation using a motion vector and a macroblock mode provided from the syntax analyzer circuit 11 and ends the processing of this flow.

At step S22, the MC controller 22 sets the values of the motion vector at x=0, y=0, and sets the forward prediction mode as the macroblock mode. That is, the MC controller 22 sets the motion vector and the macroblock mode so as to refer to a macroblock situated at the same position as the macroblock of the decoding target in a past reference frame. Next, at step S23, the MC controller 22 validates the bit value corresponding to the macroblock of the decoding target in the error map table for that macroblock. That is, the MC controller 22 updates the error map table so as to indicate that the macroblock was error-concealed. Next, at step S24, the MC controller 22 performs the motion compensation processing using the motion vector and the macroblock mode set at step S22. In this processing, the MC controller 22 switches the selector 21 and sets 0 as the input of image data of that macroblock supplied from the inverse discrete cosine transform circuit 14. The processing at this step S24 is the error conceal processing under the above-described condition 2. As the processing of step S24 ends, the MC controller 22 ends the processing of this flow.

The above-described processing is the processing by the MC controller 22 with respect to a stream including I-pictures and P-pictures.

Now, the specific contents of the error conceal processing of a stream including I-pictures and P-pictures will be described with reference to the drawings.

Figures 9A, 9B:
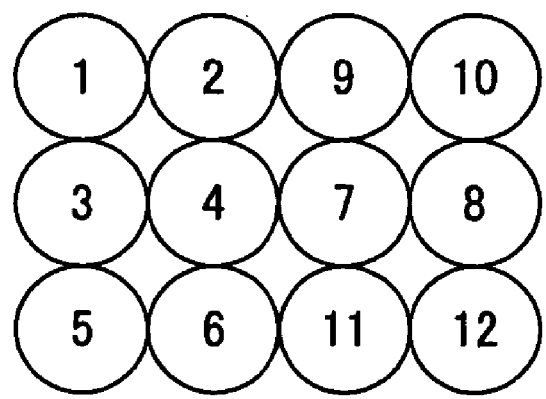
FIGS. 9A and 9B are views showing the structure of a macroblock in a frame and an error map table.

In the following description of a specific example of the error conceal processing, it is assumed that one frame includes four horizontal macroblocks by three vertical macroblocks, that is, 12 macroblocks in total. The macroblocks in the frame are numbered so that their respective positions can be specified, as shown in FIG. 9A. For example, the leftmost and top macroblock is expressed as macroblock $M_1$. The macroblock that is second from the left and on the top is expressed as macroblock $M_2$. The macroblock that is at the leftmost side and second from the top is expressed as macroblock $M_3$. The macroblock that is second from the left and second from the top is expressed as macroblock $M_4$.

Bit values in the error bit table are expressed in the form of O, as shown in FIG. 9B. A valid bit value is expressed by blacking out O and an invalid bit value is expressed by blank O. The numeral described in O is the number of the corresponding macroblock.

Figure 10:
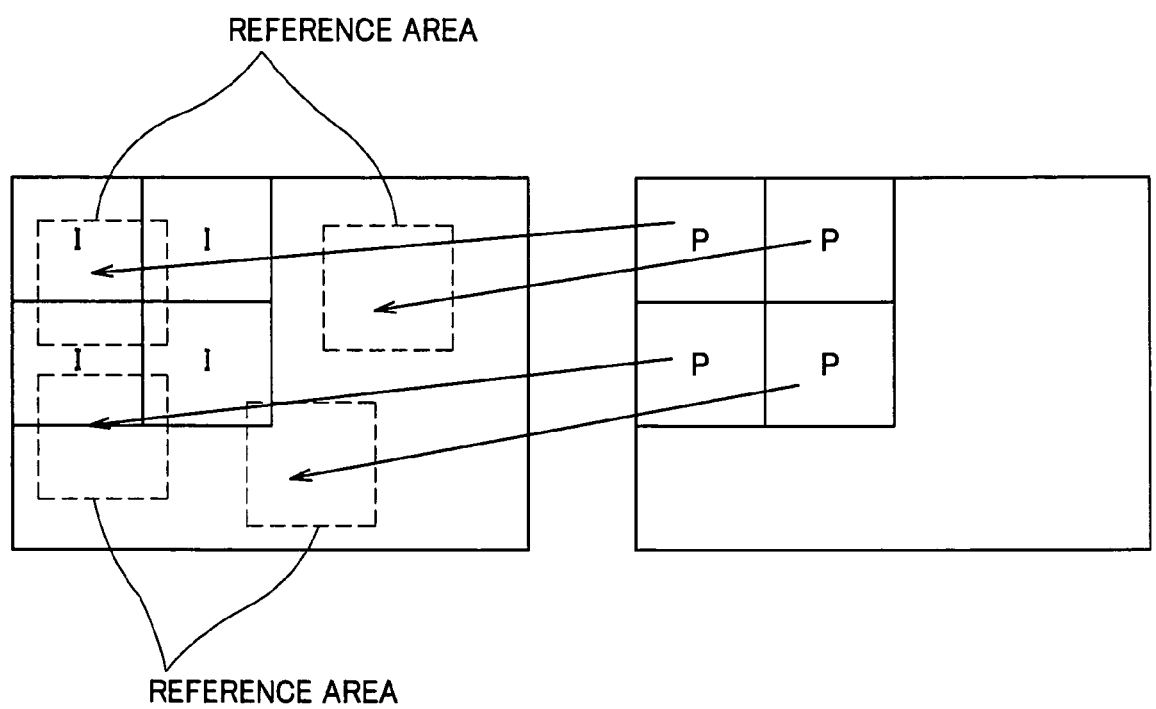
FIG. 10 is a view for explaining a reference area.

A reference area to be referred to for performing motion compensation of an arbitrary macroblock is expressed by a straight line with an arrow attached on its one side and a rectangular frame of a dotted line, as shown in FIG. 10. The start point of the straight line (end part without having an arrow) indicates the central position of the currently decoded macroblock, and the terminal part of the arrow indicates a reference area for the currently decoded macroblock. In FIG. 10, a macroblock ($M_1$) of P-picture (P1) refers to an area within an I-picture ($I_0$). A part denoted by "I" in the macroblock shown in FIG. 10 represents an intra-macroblock. A part denoted by "P" in the macroblock shown in FIG. 10 represents an inter-macroblock.

In this example, the exemplary processing for an elementary stream consisting of I-pictures and P-pictures arranged in a decoding order and display order of $P_0$, $I_1$, $P_2$, $P_3$ and $I_4$ is described.

Figure 11:
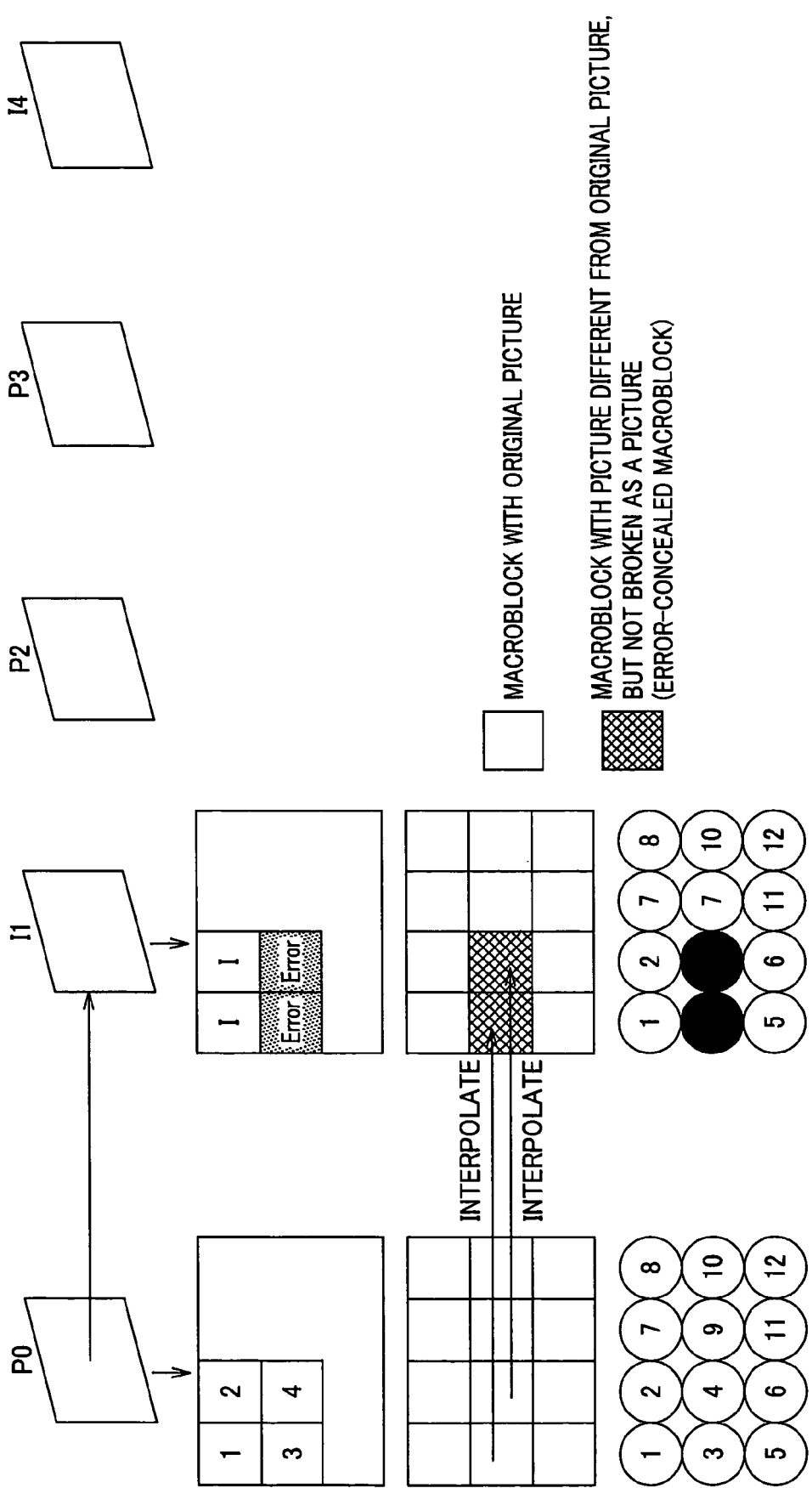
FIG. 11 is a view for explaining the specific contents of error conceal processing of the stream including I-pictures and P-pictures.

First, as shown in FIG. 11, an I-picture ($I_1$) is decoded. $I_1$ is assumed to include macroblocks ($M_3$, $M_4$) having transmission errors. In this case, the error conceal processing of the macroblocks ($M_3$, $M_4$) of $I_1$ is performed. Specifically, the macroblocks ($M_3$, $M_4$) of $I_1$ are interpolated with macroblocks ($M_3$, $M_4$) of a P-picture ($P_0$), that is, a frame that can be a past reference frame of $I_1$. In the error map table of $I_1$, the bits of the macroblocks ($M_3$, $M_4$) are validated.

Figure 12:
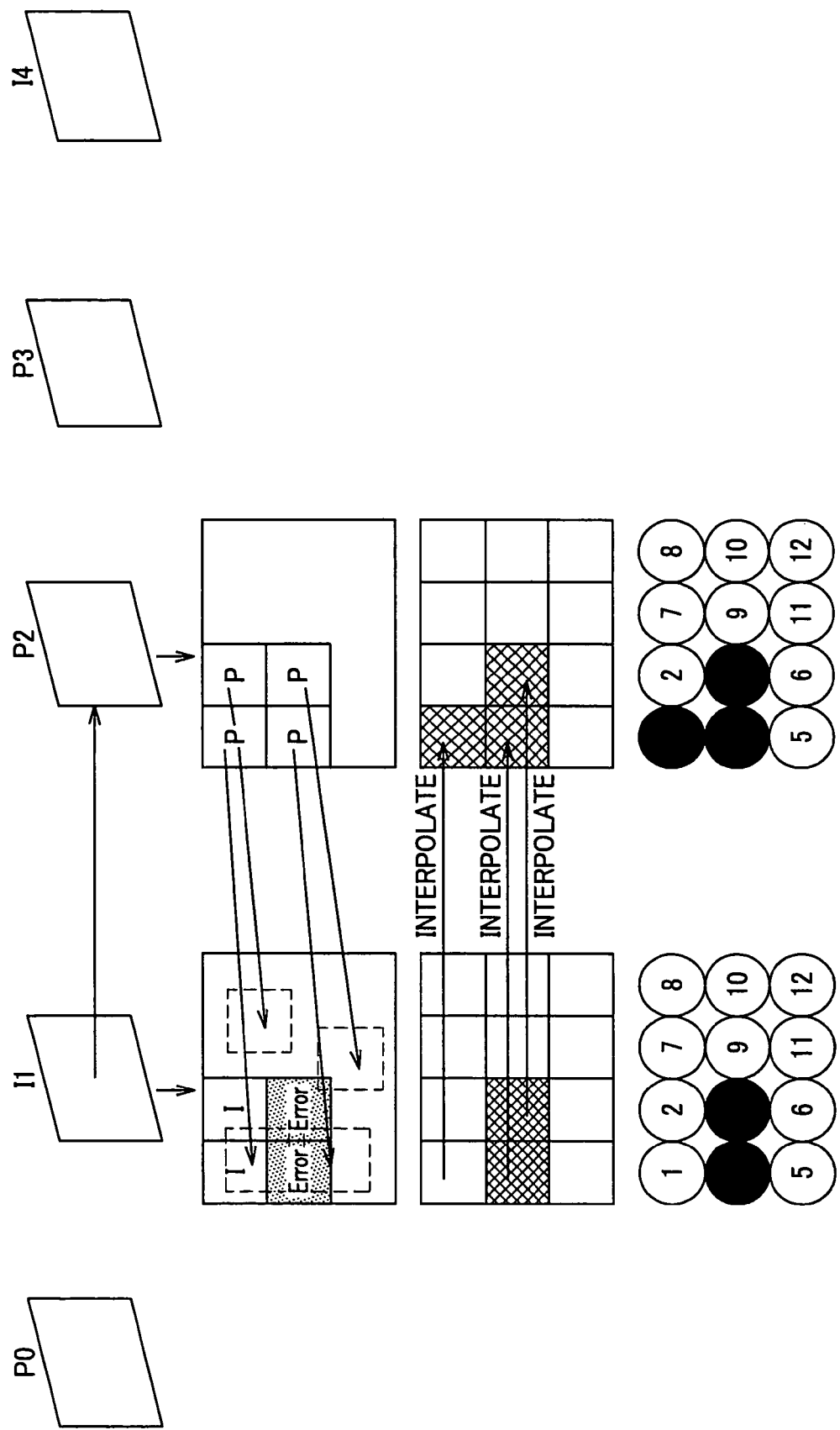
FIG. 12 is a view showing a state continuing from FIG. 11.

Next, as shown in FIG. 12, a P-picture ($P_2$) is decoded. $P_2$ is assumed to include the error-concealed macroblocks ($M_3$, $M_4$) of $I_1$ in reference areas of macroblocks ($M_1$, $M_3$, $M_4$). In this case, the error conceal processing of the macroblocks ($M_1$, $M_3$, $M_4$) of $P_2$ is performed. Specifically, the macroblocks ($M_1$, $M_3$, $M_4$) of $P_2$ are interpolated with the macroblocks $M_1$, $M_3$, $M_4$ of $I_1$, which is a reference frame of $P_2$. In the error map table of $P_2$, the bits of the macroblocks ($M_1$, $M_3$, $M_4$) are validated.

Figure 13:
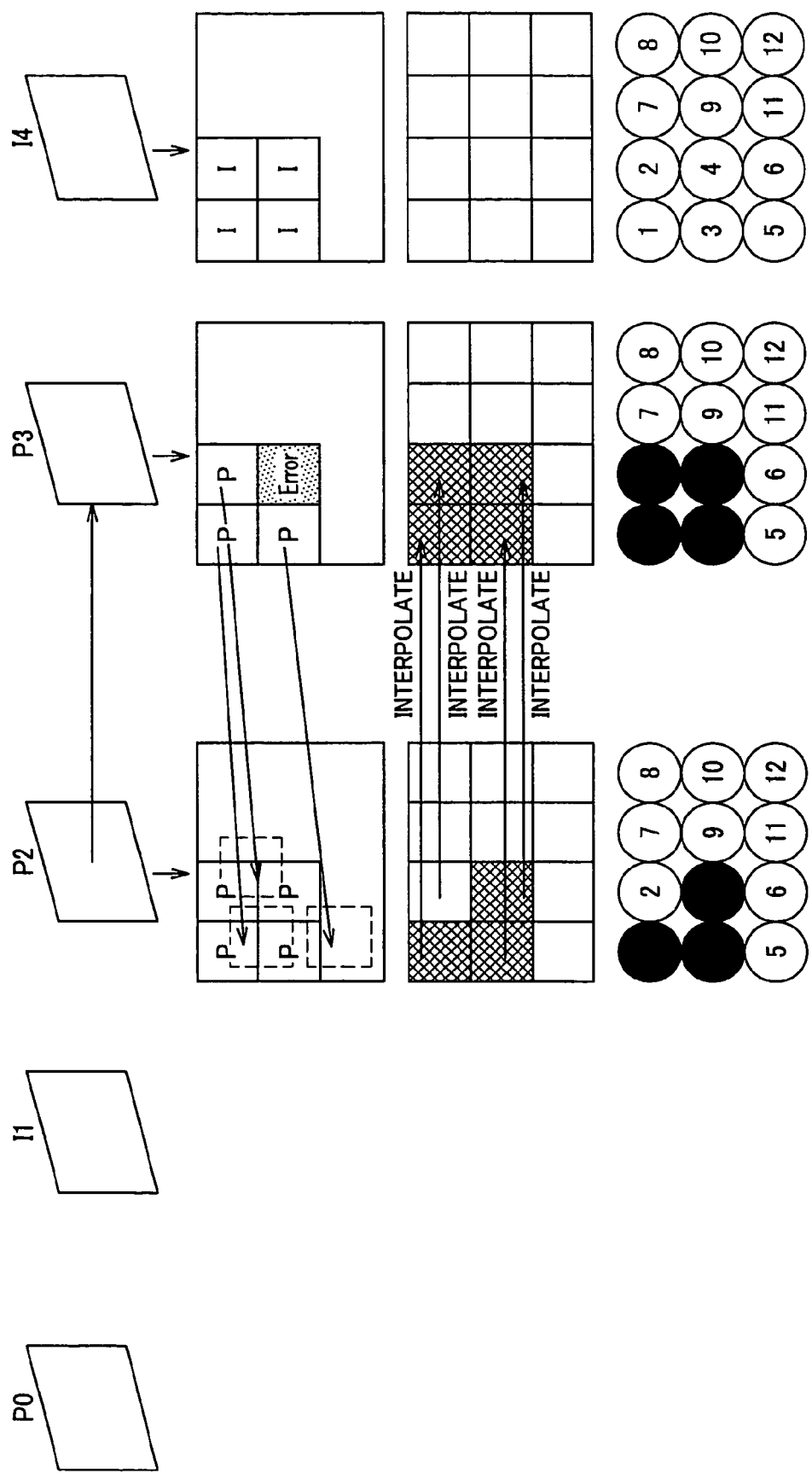
FIG. 13 is a view showing a state continuing from FIG. 12.

Next, as shown in FIG. 13, a P-picture ($P_3$) is decoded. It is assumed that the error-concealed macroblocks ($M_1$, $M_3$, $M_4$) of $P_2$ are included in reference areas of macroblocks ($M_1$, $M_2$, $M_3$) of $P_3$. In this case, the error conceal processing of the macroblocks ($M_1$, $M_2$, $M_3$) of $P_3$ is performed. It is assumed that a macroblock ($M_4$) of $P_3$ has a transmission error. In this case, the error conceal processing of the macroblock ($M_4$) of $P_3$ is performed. Specifically, the macroblocks ($M_1$, $M_2$, $M_3$, $M_4$,) of $P_3$ are interpolated with the macroblocks ($M_1$, $M_2$, $M_3$, $M_4$,) of $P_2$, which is the reference frame of $P_3$. In the error map table of $P_3$, the bits of the macroblocks ($M_1$, $M_2$, $M_3$, $M_4$,) are validated.

Hereinafter, an example of processing by the MC controller 22 with respect to a stream including I-pictures, P-pictures and B-pictures will be described.

Figure 14:
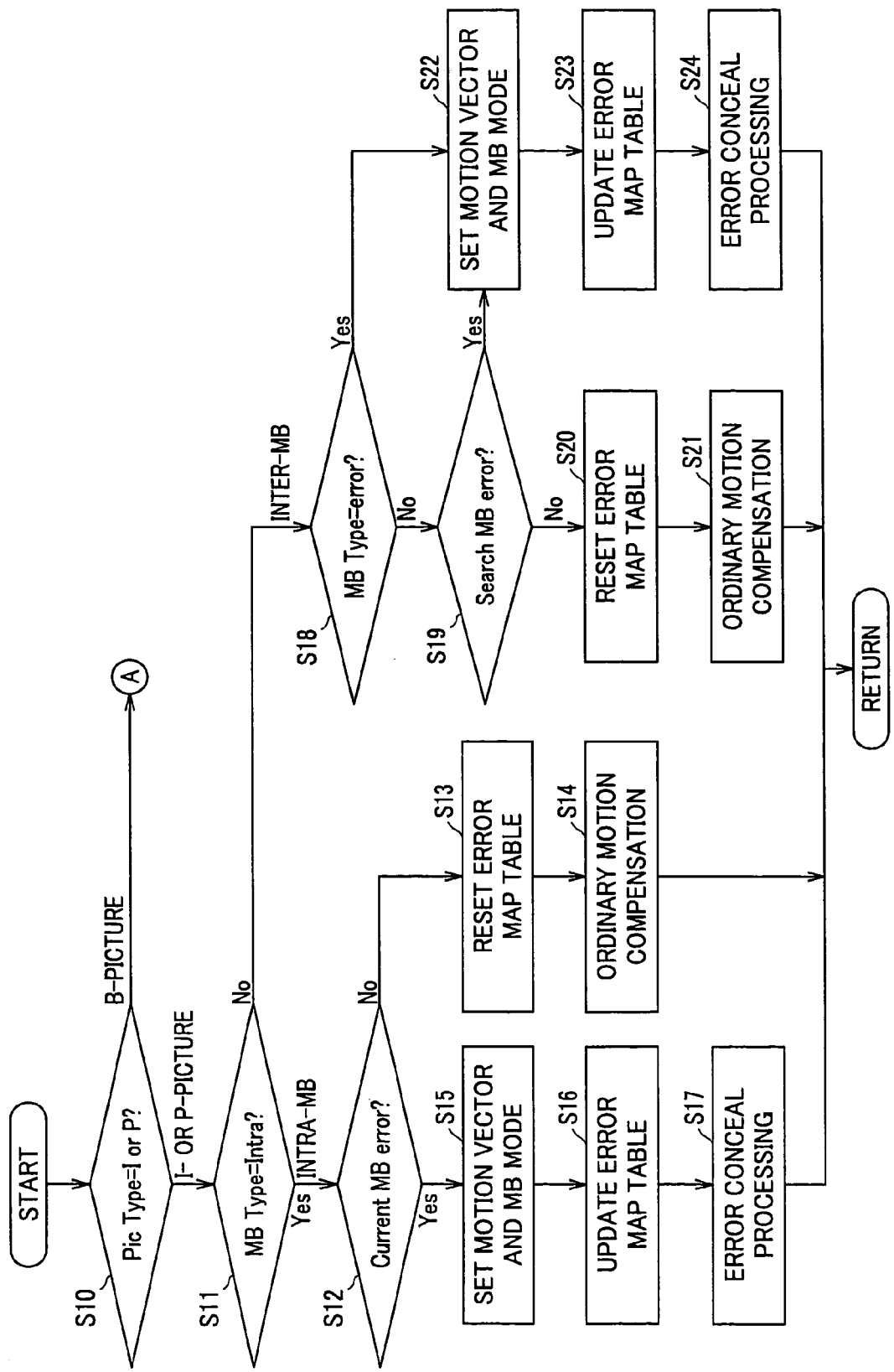
FIG. 14 is a flowchart showing the processing by the MC controller with respect to a stream including I-pictures, P-pictures and B-pictures.
Figure 15:
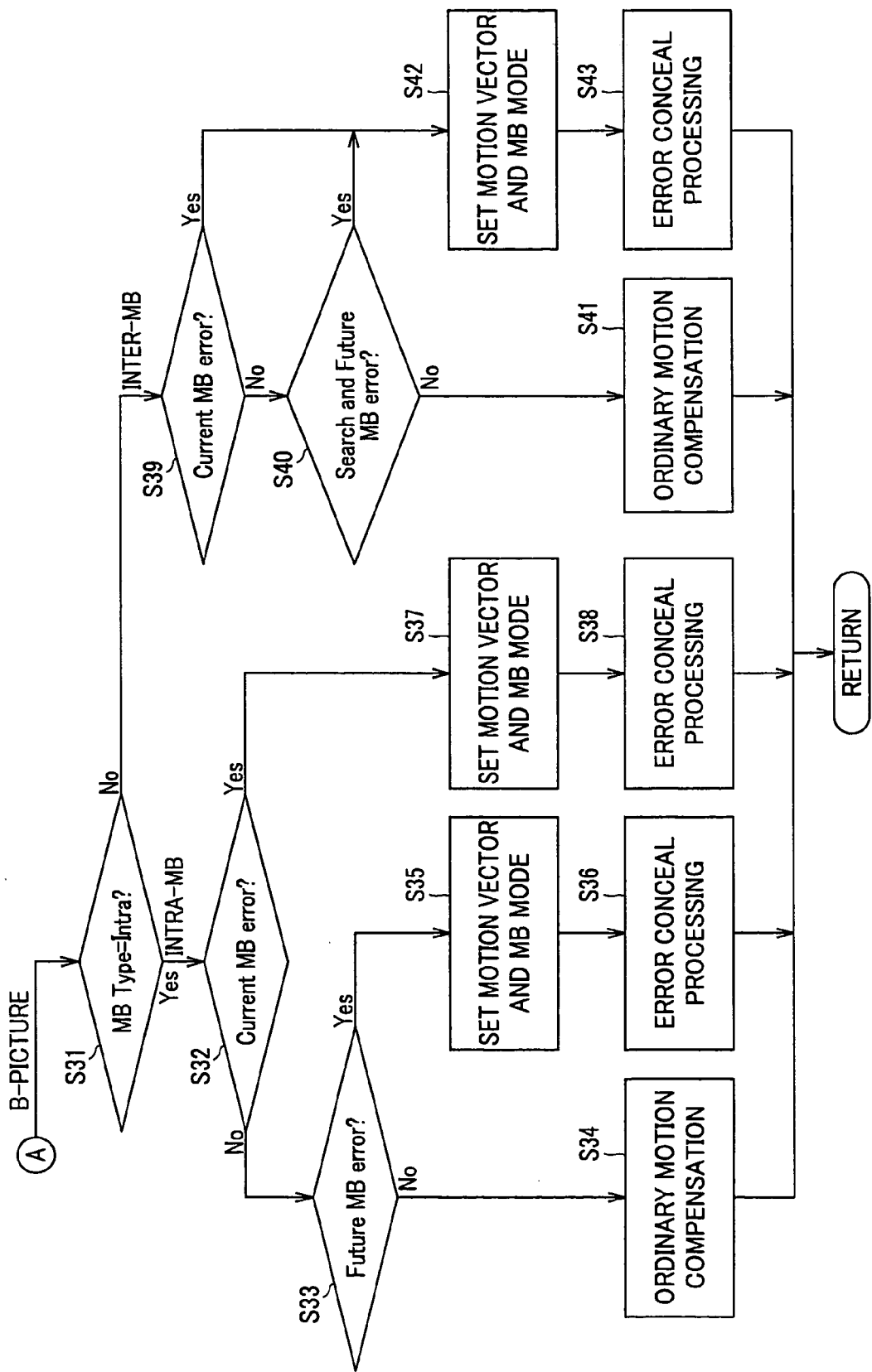
FIG. 15 is a flowchart continuing from FIG. 14.

FIGS. 14 and 15 show a processing flow in the MC controller 22 with respect to a stream including I-pictures, P-pictures and B-pictures.

The MC controller 22 repeats the processing of the following steps S10 to S43 for each macroblock inputted to the motion compensation circuit 15.

First, at step S10, the MC controller 22 judges whether a macroblock of a decoding target is a macroblock belonging to an I-picture, a macroblock belonging to a P-picture or a macroblock belonging to a B-picture, on the basis of information provided from the syntax analyzer circuit 11. If it is a macroblock belonging to an I-picture or P-picture, the processing goes to step S11. If it is a macroblock belonging to a B-picture, the processing goes to step S31.

In the case of an I-picture or P-picture, the MC controller 22 performs the same processing as the processing of steps S11 to S23 shown in FIG. 8.

In the case of a B-picture, the MC controller 22 at step S31 judges the macroblock type of the macroblock of the decoding target on the basis of information provided from the syntax analyzer circuit 11. If the macroblock type is intra-macroblock, the processing goes to step S32. If the macroblock type is inter-macroblock, the processing goes to step S36.

If the macroblock type is intra-macroblock, the MC controller 22 at step S32 judges whether or not an error flag is provided from the syntax analyzer circuit 11 with respect to the macroblock of the decoding target. That is, the MC controller 22 judges whether or not an error has occurred in the macroblock of the decoding target. If an error has not occurred, the processing goes to step S33. If an error has occurred, the processing goes to step S37.

At step S33, the MC controller 22 refers to an error map table with respect to a future reference frame and judges whether or not a macroblock at the same position as the currently decoded macroblock has already been error-concealed. If the macroblock has not been error-concealed, the processing goes to step S34. If the macroblock has been error-concealed, the processing goes to step S35.

At step S34, the MC controller 22 performs ordinary motion compensation using a motion vector and a macroblock mode provided from the syntax analyzer circuit 11 and ends the processing of this flow.

At step S35, the MC controller 22 sets the values of a motion vector at x=0 and y=0, and also sets a backward prediction mode as the macroblock mode. That is, the motion vector and the macroblock mode are set so as to refer to a macroblock situated at the same position as the macroblock of the decoding target, in a future reference frame. Next, at step S36, the MC controller 22 performs motion compensation processing using the motion vector and the macroblock mode set at step S35. In this processing, the selector 21 is switched to set 0 as the input of image data of that macroblock supplied from the discrete cosine transform circuit 14. The processing of this step S36 is the error conceal processing under the above-described condition 3. When the processing of step S36 is completed, the MC controller 22 ends the processing of this flow.

At step S37, the MC controller 22 sets the values of a motion vector at x=0 and y=0, and also sets a forward prediction mode as the macroblock mode. That is, the motion vector and the macroblock mode are set so as to refer to a macroblock situated at the same position as the macroblock of the decoding target, in a past reference frame. Next, at step S38, the MC controller 22 performs motion compensation processing using the motion vector and the macroblock mode set at step S37. In this processing, the selector 21 is switched to set 0 as the input of image data of that macroblock supplied from the discrete cosine transform circuit 14. The processing of this step S38 is the error conceal processing under the above-described condition 1. When the processing of step S38 is completed, the MC controller 22 ends the processing of this flow.

On the other hand, if the macroblock type is inter-macroblock, the MC controller 22 at step S39 judges whether or not an error flag is provided from the syntax analyzer circuit 11 with respect to the macroblock of the decoding target. That is, the MC controller 22 judges whether or not an error has occurred in the macroblock of the decoding target. If an error has not occurred, the processing goes to step S40. If an error has occurred, the processing goes to step S42.

At step S40, the MC controller 22 judges whether or not a macroblock included in the reference area has already been error-concealed, or whether or not a macroblock at the same position as the currently decoded macroblock has already been error-concealed.

This judgment at step S19 can be made, for example, by executing the following program.

f_Vector_xr. Since one macroblock includes 16×16 pixels, as the value in the X-direction of the motion vector is divided by 16, the value of the motion vector expressed for each pixel can be converted to a motion vector expressed for each macroblock. That is, on this line 10, the forward motion vector (f_Vector_xr) in the X-direction converted by macroblock is calculated. The forward motion vector is a motion vector referring to a past reference frame.

On line 20, four-bit right-shift operation of the value (f_Vector_y) in the Y-direction of the original forward motion vector expressed by binary numbers is performed and the resulting value is substituted into the variable f_Vector_xy. That is, on this line 20, the forward motion vector (f_Vector_xy) in the Y-direction converted by macroblock is calculated.

On line 30, if the value (f_Vector_x) in the X-direction of the original forward motion vector can be divided by 16 without a remainder, 0 is substituted into the variable f_x_flag. If the value f_Vector_x cannot be divided by 16 without a remainder and is negative, −1 is substituted into the variable f_x_flag. If the value f_Vector_x cannot be divided by 16 without a remainder and is not negative, 1 is substituted into the variable f_x_flag. That is, if the position in the X-direction of the reference area with respect to the past reference frame perfectly coincides with the boundary position of the macroblock, 0 is substituted into f_x_flag. If not, 1 or −1 is substituted into f_x_flag. If the position does

```
10: f_Vector_xr = f_Vector_x >> 4
20: f_Vector_yr = f_Vector_y >> 4
30: If(f_Vector_x % 16! = 0)
    If(f_vector_x < 0) f_x_flag=−1 else f_x_flag = 1
    else f_x_flag = 0
40: If(f_Vector_y % 16! = 0)
    If(f_vector_y < 0) f_y_flag=−1 else f_y_flag = 1
    else f_y_flag = 0
50: b_Vector_xr = b_Vector_x >> 4
60: b_Vector_yr = b_Vector_y >> 4
70: If(b_Vector_x % 16! = 0)
    If(b_vector_x < 0) b_x_flag=−1 else b_x_flag = 1
    else b_x_flag = 0
80: If(b_Vector_y % 16! = 0)
    If(b_vector_y < 0) b_y_flag=−1 else b_y_flag = 1
    else b_y_flag = 0
90: f_MB_flag = {f_Error_Map[mb_adr_x + f_Vector_xr][mb_adr_y + f_Vector_yr] or
f_Error_Map[mb_adr_x + f_Vector_xr + f_x_flag][mb_adr_y + f_Vector_yr] or
f_Error_Map[mb_adr_x + f_Vector_xr][mb_adr_y + f_Vector_yr + f_y_flag] or
f_Error_Map[mb_adr_x + f_Vector_xr + f_x_flag][mb_adr_y + f_Vector_yr + f_y_flag]}
100: b_MB_flag = {b_Error_Map[mb_adr_x + b_Vector_xr][mb_adr_y + b_Vector_yr] or
b_Error_Map[mb_adr_x + b_Vector_xr + b_x_flag][mb_adr_y + b_Vector_yr] or
b_Error_Map[mb_adr_x + b_Vector_xr][mb_adr_y + b_Vector_yr + b_y_flag] or
b_Error_Map[mb_adr_x + b_Vector_xr + b_x_flag][mb_adr_y + b_Vector_yr + b_y_flag]}
110: c_MB_flag = b_Error_Map[mb_adr_x][mb_adr_y]
120: MB_flag = f_MB_flag or b_MB_flag or c_MB_flag
130: if(MB_flag = 1) Search_or_Future_MB_error = Yes
140: if(MB_flag = 0) Search_or_Future_MB_error = No
```

The above-described program will be described in detail.

On line 10, four-bit right-shift operation of the value (f_Vector_x) in the X-direction of an original forward motion vector expressed by binary numbers is performed and the resulting value is substituted into the variable not coincide, the reference area with respect to the past reference frame is situated over two macroblocks in the X-directions.

On line 40, if the value (f_Vector_y) in the Y-direction of the original forward motion vector can be divided by 16 without a remainder, 0 is substituted into the variable f_y_flag. If the value f_Vector_y cannot be divided by 16 without a remainder and is negative, −1 is substituted into the variable f_y_flag. If f_Vector_y cannot be divided by 16 without a remainder and is not negative, 1 is substituted into the variable f_y_flag. That is, if the position in the Y-direction of the reference area with respect to the past reference frame perfectly coincides with the boundary position of the macroblock, 0 is substituted into f_y_flag. If not, 1 or −1 is substituted into f_y_flag. If the position does not coincide, the reference area with respect to the past reference frame is situated over two macroblocks in the Y-directions.

On line 50, four-bit right-shift operation of the value (b_Vector_x) in the X-direction of an original backward motion vector expressed by binary numbers is performed and the resulting value is substituted into the variable b_Vector_xr. Since one macroblock includes 16×16 pixels, as the value in the X-direction of the motion vector is divided by 16, the value of the motion vector expressed for each pixel can be converted to a motion vector expressed for each macroblock. That is, on this line 50, the backward motion vector (b_Vector_xr) in the X-direction converted by macroblock is calculated. The backward motion vector is a motion vector referring to a future reference frame.

On line 60, four-bit right-shift operation of the value (b_Vector_y) in the Y-direction of the original motion vector expressed by binary numbers is performed and the resulting value is substituted into the variable b_Vector_xy. That is, on this line 60, the backward motion vector (b_Vector_xy) in the Y-direction converted by macroblock is calculated.

On line 70, if the value (b_Vector_x) in the X-direction of the original forward motion vector can be divided by 16 without a remainder, 0 is substituted into the variable b_x_flag. If the value b_Vector_x cannot be divided by 16 without a remainder and is negative, −1 is substituted into the variable b_x_flag. If the value b_Vector_x cannot be divided by 16 without a remainder and is not negative, 1 is substituted into the variable b_x_flag. That is, if the position in the X-direction of the reference area with respect to the past reference frame perfectly coincides with the boundary position of the macroblock, 0 is substituted into b_x_flag. If not, 1 or −1 is substituted into b_x_flag. If the position does not coincide, the reference area with respect to the past reference frame is situated over two macroblocks in the X-directions.

On line 80, if the value (b_Vector_y) in the Y-direction of the original forward motion vector can be divided by 16 without a remainder, 0 is substituted into the variable b_y_flag. If the value b_Vector_y cannot be divided by 16 without a remainder and is negative, −1 is substituted into the variable b_y_flag. If b_Vector_y cannot be divided by 16 without a remainder and is not negative, 1 is substituted into the variable b_y_flag. That is, if the position in the Y-direction of the reference area with respect to the past reference frame perfectly coincides with the boundary position of the macroblock, 0 is substituted into b_y_flag. If not, 1 or −1 is substituted into b_y_flag. If the position does not coincide, the reference area with respect to the past reference frame is situated over two macroblocks in the Y-directions.

On line 90, the error map table for the past reference frame is referred to and bit values in the error map table corresponding to all the macroblocks (four macroblocks at the maximum) included in the reference area are found. The logical sum of these is calculated and substituted into the variable f_MB_flag. The operation expression f_Error_Map [X][Y] reads out a bit at the position of addresses X, Y in the error map table for the past reference frame. mb_adr_x indicates the address in the X-direction of the currently decoded macroblock, and mb_adr_y indicates the address in the Y-direction of the currently decoded macroblock.

On line 100, the error map table for the future reference frame is referred to and bit values in the error map table corresponding to all the macroblocks (four macroblocks at the maximum) included in the reference area are found. The logical sum of these is calculated and substituted into the variable b_MB_flag. The operation expression b_Error_Map[X][Y] reads out a bit at the position of addresses X, Y in the error map table for the future reference frame.

On line 110, with reference to the error map table for the future reference frame, a bit value in the error map table corresponding to a macroblock situated at the same position as the currently decoded macroblock is found and substituted into the variable c_MB_flag.

On line 120, the logical sum of the variables f_MB_flag, b_MB_flag and c_MB_flag is calculated and substituted into MB_flag.

On lines 130 and 140, if the variable MB_flag is 1, that is, if MB_flag is valid, it is judged that Search_or_Future_MB_error=Yes (the value of a bit corresponding to a reference macroblock in the error map table with respect to the reference frame is valid, or a macroblock situated at the same position as the currently decoded macroblock has already been error-concealed). If the variable MB_flag is 0, that is, if MB_flag is invalid, it is judged that Search_or_Future_MB_error=No (the value of a bit corresponding to a reference macroblock in the error map table with respect to the reference frame is not valid, and a macroblock situated at the same position as the currently decoded macroblock has not been error-concealed yet).

By executing the processing program of the above-described lines 10 to 140, the MC controller 22 can judge whether or not the reference area has already been error-concealed, or whether or not the macroblock situated at the same position as the currently decoded macroblock has already been error-concealed. If the MC controller 22 judges that the reference area had not been error-concealed, the processing goes to step S41. If the MC controller 22 judges that the reference area has already been error-concealed, the processing goes to step S42.

At step S41, the MC controller 22 performs ordinary motion compensation using a motion vector and a macroblock mode provided from the syntax analyzer circuit 11 and ends the processing of this flow.

At step S42, the MC controller 22 sets the values of the motion vector at x=0, y=0, and sets the backward prediction mode as the macroblock mode. That is, the MC controller 22 sets the motion vector and the macroblock mode so as to refer to a macroblock situated at the same position as the macroblock of the decoding target in a future reference frame. Next, at step S43, the MC controller 22 performs the motion compensation processing using the motion vector and the macroblock mode set at step S42. In this processing, the MC controller 22 switches the selector 21 and sets 0 as the input of image data of that macroblock supplied from the inverse discrete cosine transform circuit 14. The processing at this step S43 is the error conceal processing under the above-described condition 2 or 3. As the processing of step S43 ends, the MC controller 22 ends the processing of this flow.

The above-described processing is the processing by the MC controller 22 with respect to a stream including I-pictures, P-pictures and B-pictures.

Now, the specific contents of the error conceal processing with respect to a stream including I-pictures, P-picture and B-pictures will be described with reference to the drawings.

The descriptions in the drawings are the same conditions as the above-described explanatory conditions used for a stream including I-pictures and P-pictures. In this example, processing of an elementary stream having a decoding order of P10, B9, I2, B1 and P3 and a display order of B9, P10, B1, I2 and P3 will be described.

Figure 16:
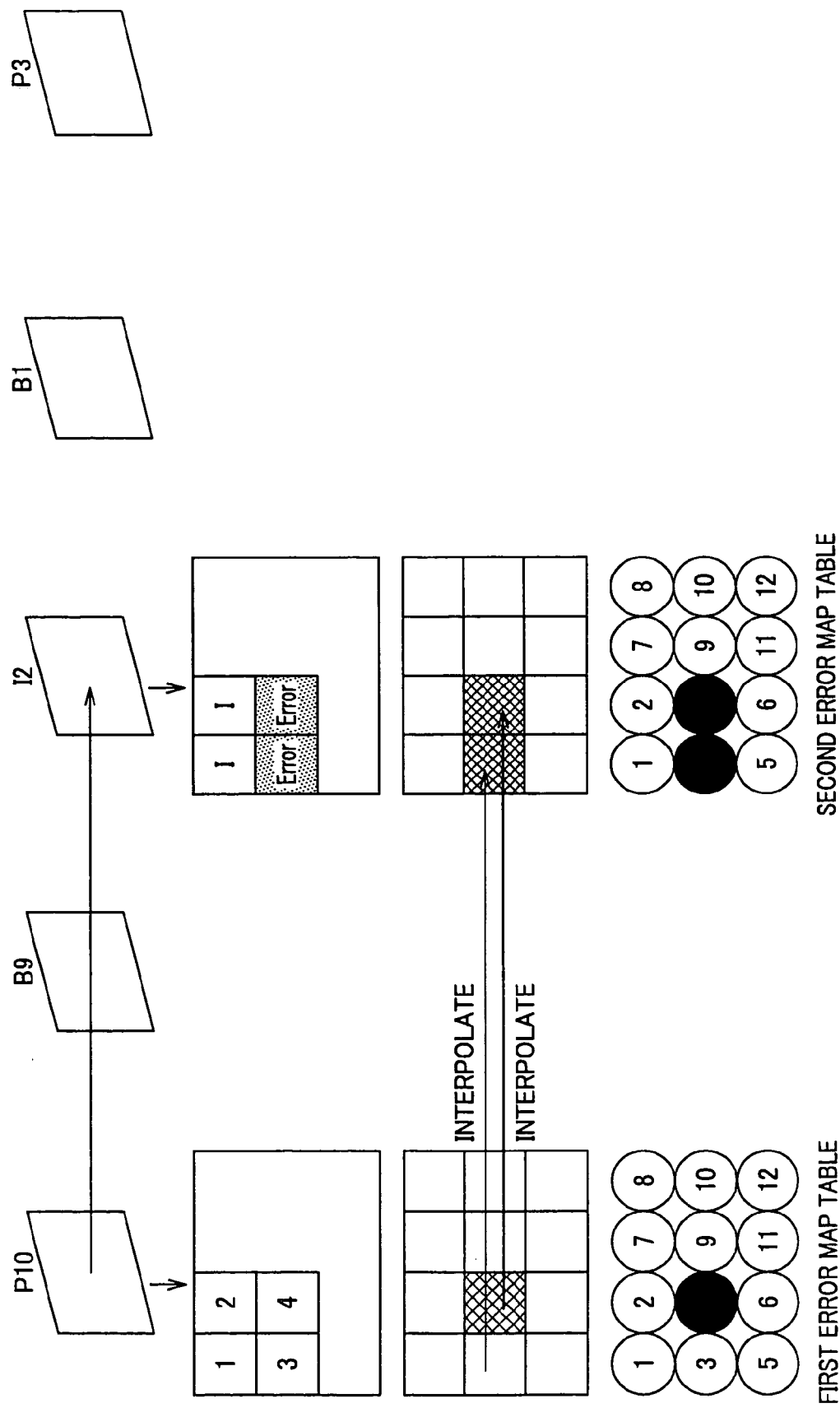
FIG. 16 is a view for explaining the specific contents of error conceal processing of the stream including I-pictures, P-picture and B-pictures.

First, as shown in FIG. 16, an I-picture ($I_2$) is decoded. $I_2$ is assumed to include macroblocks ($M_3$, $M_4$) having transmission errors. In this case, the error conceal processing of the macroblocks ($M_3$, $M_4$) of $I_2$ is performed. Specifically, the macroblocks ($M_3$, $M_4$) of $I_2$ are interpolated with macroblocks ($M_3$, $M_4$) of a P-picture ($P_{10}$), that is, a frame that can be a past reference frame of $I_2$. In the error map table of $I_2$ (second error map table), the bits of the macroblocks ($M_3$, $M_4$) are validated.

Figure 17:
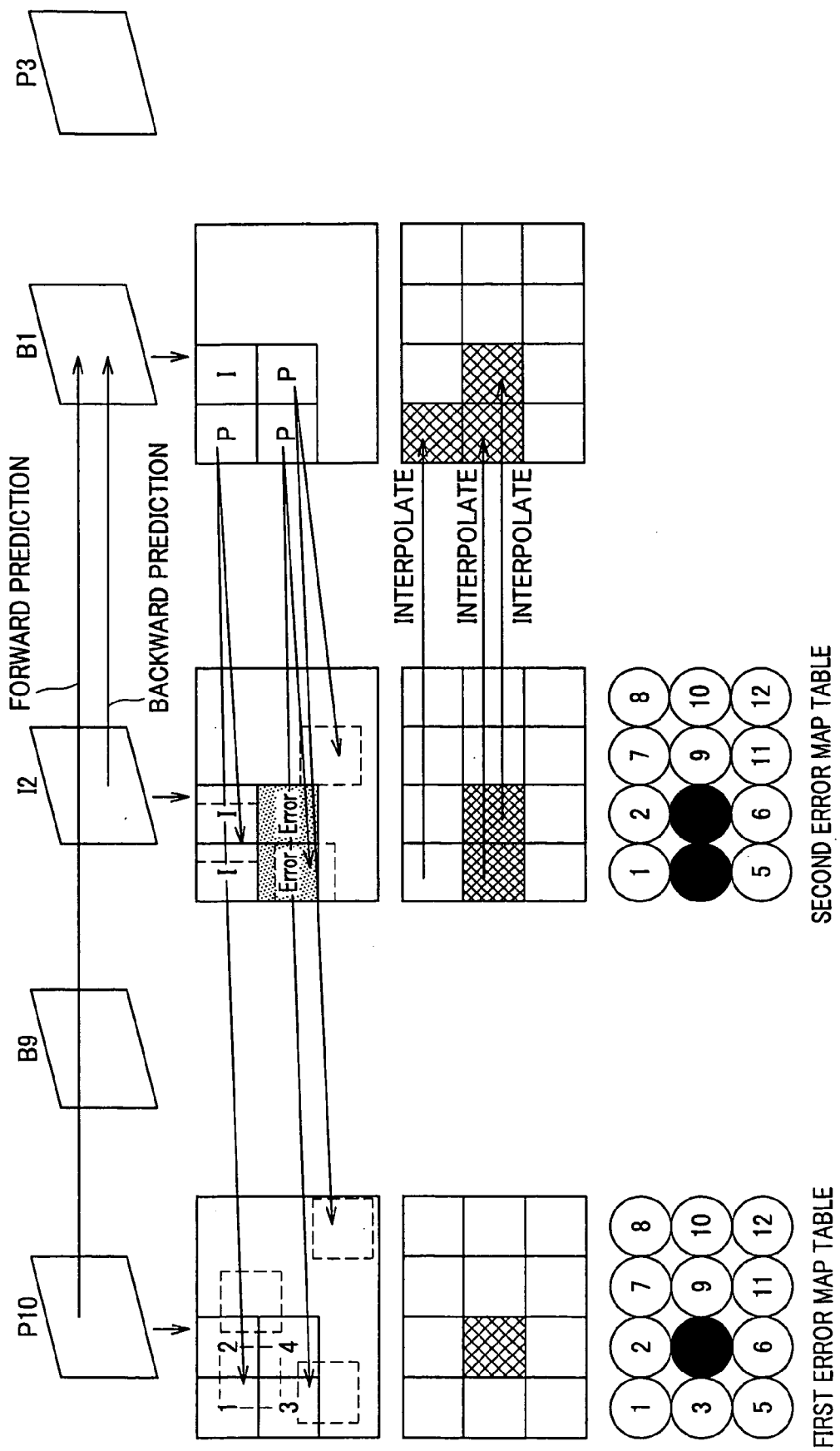
FIG. 17 is a view showing a state continuing from FIG. 16.

Next, as shown in FIG. 17, a B-picture ($B_1$) is decoded.

A reference area of a macroblock ($M_1$) of $B_1$ includes macroblocks ($M_1$ to $M_4$) of a past reference frame $P_{10}$ and macroblocks ($M_1$, $M_2$) of a future reference frame $I_2$. In this case, since $M_4$ of the past reference frame $P_{10}$ has already been error-concealed, the error conceal processing of the macroblock ($M_1$) of $B_1$ is performed.

Since a macroblock ($M_2$) of $B_1$ is an intra-macroblock and has no error, the error conceal processing of this macroblock is not performed.

A reference area of a macroblock ($M_3$) of $B_1$ includes macroblocks ($M_3$ to $M_6$) of the past reference frame $P_{10}$ and macroblocks ($M_3$, $M_5$) of the future reference frame $I_2$. In this case, since the macroblock ($M_4$) of the past reference frame $P_{10}$ and the macroblock ($M_3$) of the future reference frame $I_2$ have already been error-concealed, the error conceal processing of the macroblock ($M_3$) of $B_1$ is performed.

A reference area of a macroblock ($M_4$) of $B_1$ includes no error-concealed macroblocks of the past or future reference frame. However, the macroblock $M_4$ of the future reference frame $I_2$ situated at the same position as this macroblock $M_4$ of $B_1$ has already been error-concealed. Therefore, also the error conceal processing of this macroblock $M_4$ of $B_1$ is performed.

Figure 18:
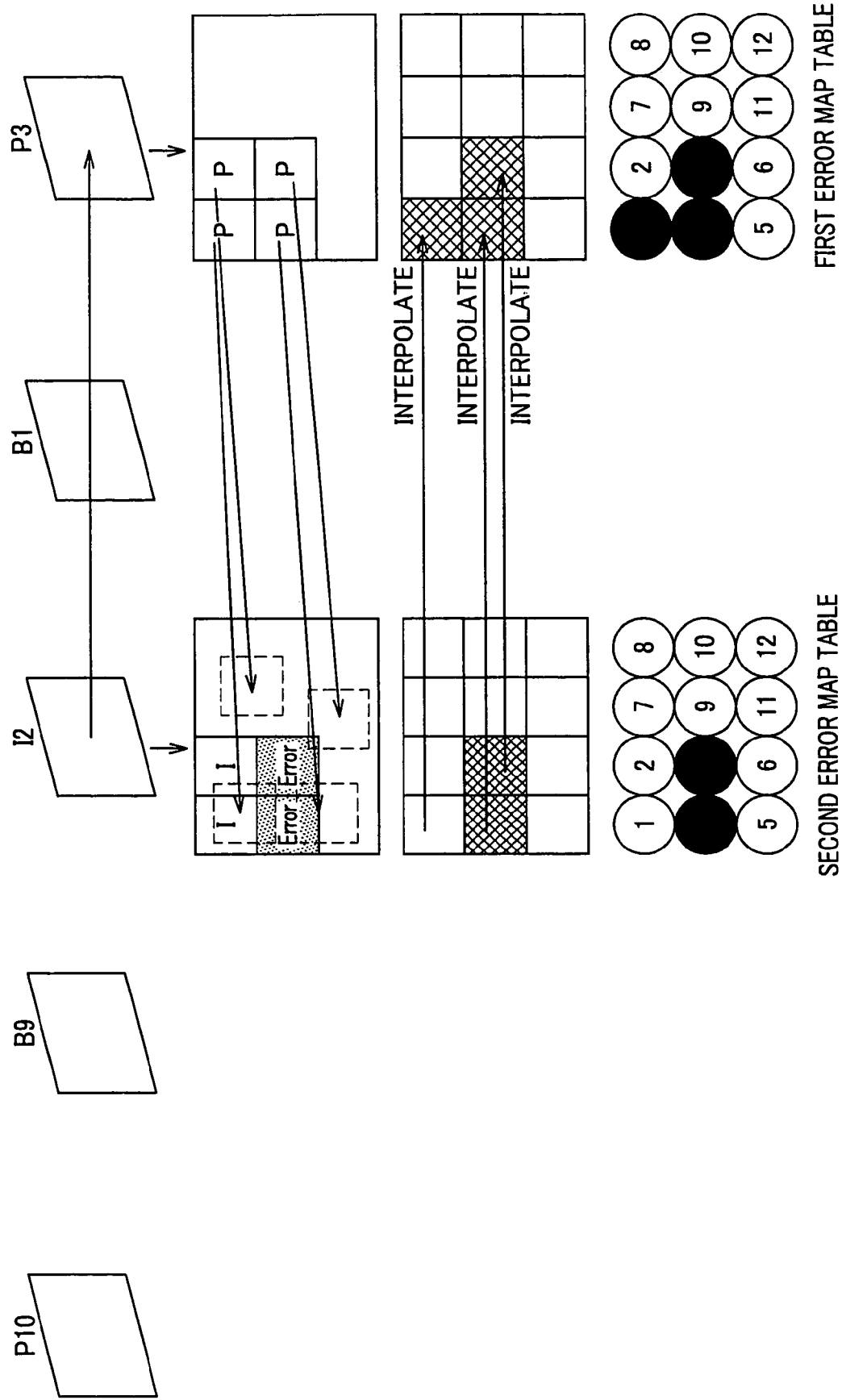
FIG. 18 is a view showing a state continuing from FIG. 17.

Next, as shown in FIG. 18, a P-picture ($P_3$) is decoded.

For this P-picture ($P_3$), the bit is updated in the first error map table in which the error conceal information of the P-picture ($P_{10}$) was previously stored.

As described above, in the MPEG decoding apparatus 10 according to the present invention, coded data using motion prediction can be decoded. In this MPEG decoding apparatus 10, even when an image block that is broken at the time of transmission or the like exists in a frame, the error conceal processing can be performed to interpolate the image block with an image block of another frame that is not broken. Therefore, it is possible to reduce visual imperfection due to the presence of a block that is extremely different from the peripheral normal image because of an error.

Moreover, in the MPEG decoding apparatus 10 according to the present invention, even when a block of an image that is being decoded refers to a frame including an error in motion compensation, propagation of the error due to the error conceal processing can be restrained and deterioration in image quality can be reduced.

While the invention has been described in accordance with certain preferred embodiment thereof illustrated in the accompanying drawings and described in the above description in detail, it should be understood by those ordinarily skilled in the art that the invention is not limited to the embodiment, but various modifications, alternative constructions or equivalents can be implemented without departing from the scope and spirit of the present invention as set forth and defined by the appended claims.

INDUSTRIAL APPLICABILITY

In the image decoding apparatus and the image decoding method according to the present invention, when an error map table is referred to and an error block is found to be included in a block included in a reference area, or when dynamic image coded data of a decoding target block is broken, error conceal processing to interpolate pixels in the decoding target block with pixels of a decoded frame and output the resulting block is performed, and an error map table is generated in which the error-concealed block is regarded as an error block. Therefore, error-concealed coded data using motion compensation can be decoded. In the present invention, even when an image block that is broken at the time of transmission or the like exists in a frame, the error conceal processing can be performed to interpolate the image block with an image block of another frame that is not broken. Therefore, it is possible to reduce visual imperfection due to the presence of a block that is extremely different from the peripheral normal image because of an error.

Moreover, in the image decoding apparatus according to the present invention, even when a block of an image that is being decoded refers to a frame including an error in motion compensation, propagation of the error due to the error conceal processing can be restrained and deterioration in image quality can be reduced.

The invention claimed is:

1. An image decoding apparatus for decoding dynamic image coded data coded by a coding system for dividing a frame into plural blocks and performing motion prediction coding of each block, the apparatus comprising:

motion compensation means for, when the motion prediction-coded block is a decoding target block, specifying a reference area in a decoded frame using motion prediction information included in the image coded data and performing motion compensation of the decoding target block using information of the specified reference area; and error map table holding means for holding an error map table with respect to the decoded frame to be referred to when performing the motion compensation;

wherein an error block existing in the decoded frame is shown in the error map table, and when the error map table is referred to and an error block is found to be included in the block included in the reference area, or when the dynamic image coded data of the decoding target block is broken, the motion compensation means performs error conceal processing to interpolate a pixel in the decoding target block with a pixel of the decoded frame and output the resulting data, then generates an error map table showing the error-concealed block as an error block, and stores the error map table into the error map table holding means;

wherein the reference area is an arbitrary area within a reference frame to be referred to when performing the motion compensation and a position of said reference area is specified by a motion vector with respect to the decoding target block.

2. The image decoding apparatus as claimed in claim 1, wherein when performing the error conceal processing, the motion compensation means interpolates a pixel in the decoding target block with a pixel of the decoded frame situated at the same position as the decoding target block.

3. The image decoding apparatus as claimed in claim 1, wherein when performing the error conceal processing with respect to an intra-frame prediction frame including only blocks that are coded without referring to another frame or with respect to a forward prediction frame including blocks coded without referring to another frame and blocks that are motion-predicted with reference to a past frame, the motion compensation means interpolates a pixel in the decoding target block by using a pixel in a past frame that is before a frame including the decoding target block.

4. The image decoding apparatus as claimed in claim 3, wherein when performing the error conceal processing with respect to an intra-frame prediction frame, the motion compensation means interpolates a pixel in the decoding target block by using a pixel of a forward prediction frame that is immediately before the inter-frame prediction frame.

5. The image decoding apparatus as claimed in claim 3, wherein when performing the error conceal processing with respect to a forward prediction frame, the motion compensation means interpolates a pixel in the decoding target block by using a pixel of a reference frame of the forward prediction frame.

6. The image decoding apparatus as claimed in claim 1, when performing the error conceal processing with respect to a bidirectional prediction frame that can be motion-predicted with reference to a past and/or future frame, the motion compensation means interpolates a pixel in the decoding target block by using a pixel of a future reference frame that is after a frame including the decoding target block.

7. The image decoding apparatus as claimed in claim 6, wherein when performing the error conceal processing with respect to the bidirectional prediction frame, the motion compensation means interpolates a pixel in the decoding target block by using a pixel of a future reference frame of the bidirectional prediction frame.

8. The image decoding apparatus as claimed in claim 1, wherein when performing motion compensation with respect to a bidirectional prediction frame that can be motion-predicted with reference to a past and/or future frame, if a block situated at the same position as the decoding target block, of blocks of a future reference frame of the bidirectional prediction frame, has already been error-concealed, the motion compensation means interpolates a pixel in the decoding target block by using a pixel of the future reference frame.

9. An image decoding method for decoding dynamic image coded data coded by a coding system for dividing a frame into plural blocks and performing motion prediction coding of each block, the method comprising:

specifying a reference area in a decoded frame using motion prediction information included in the image coded data, then performing motion compensation of the decoding target block using information of the specified reference area, and thus decoding the dynamic image coded data;

wherein in performing the motion compensation, when an error map table showing an error block existing in the decoded block is referred to and an error block is found to be included in the block included in the reference area, or when the dynamic image coded data of the decoding target block is broken, error conceal processing to interpolate a pixel in the decoding target block with a pixel of the decoded frame and output the resulting data is performed, and an error map table showing the error-concealed block as an error block is generated;

wherein the reference area is an arbitrary area within a reference frame to be referred to when performing the motion compensation and a position of said reference area is specified by a motion vector with respect to the decoding target block.

10. The image decoding method as claimed in claim 9, wherein when performing the error conceal processing, a pixel in the decoding target block is interpolated with a pixel of the decoded frame situated at the same position as the decoding target block.

11. The image decoding method as claimed in claim 9, wherein when performing the error conceal processing with respect to an intra-frame prediction frame including only blocks that are coded without referring to another frame or with respect to a forward prediction frame including blocks coded without referring to another frame and blocks that are motion-predicted with reference to a past frame, a pixel in the decoding target block is interpolated by using a pixel in a past frame that is before a frame including the decoding target block.

12. The image decoding method as claimed in claim 11, wherein when performing the error conceal processing with respect to an intra-frame prediction frame, a pixel in the decoding target block is interpolated by using a pixel of a forward prediction frame that is immediately before the inter-frame prediction frame.

13. The image decoding method as claimed in claim 11, wherein when performing the error conceal processing with respect to a forward prediction frame, a pixel in the decoding target block is interpolated by using a pixel of a reference frame of the forward prediction frame.

14. The image decoding method as claimed in claim 9, when performing the error conceal processing with respect to a bidirectional prediction frame that can be motion-predicted with reference to a past and/or future frame, a pixel in the decoding target block is interpolated by using a pixel of a future reference frame that is after a frame including the decoding target block.

15. The image decoding method as claimed in claim 14, wherein when performing the error conceal processing with respect to the bidirectional prediction frame, a pixel in the decoding target block is interpolated by using a pixel of a future reference frame of the bidirectional prediction frame.

16. The image decoding method as claimed in claim 9, wherein when performing motion compensation with respect to a bidirectional prediction frame that can be motion-predicted with reference to a past and/or future frame, if a block situated at the same position as the decoding target block, of blocks of a future reference frame of the bidirectional prediction frame, has already been error-concealed, a pixel in the decoding target block is interpolated by using a pixel of the future reference frame.

* * * * *